(12) United States Patent
Favre et al.

(10) Patent No.: US 11,932,330 B2
(45) Date of Patent: Mar. 19, 2024

(54) ENDLESS TRACK FOR TRACTION OF A VEHICLE

(71) Applicant: Camso Inc., Magog (CA)

(72) Inventors: Marc Favre, Sherbrooke (CA); Jake Dalphond, Magog (CA)

(73) Assignee: Camso Inc., Magog (CA)

( * ) Notice: Subject to any disclaimer, the term of this patent is extended or adjusted under 35 U.S.C. 154(b) by 680 days.

(21) Appl. No.: 16/904,194

(22) Filed: Jun. 17, 2020

(65) Prior Publication Data

US 2021/0009217 A1 Jan. 14, 2021

Related U.S. Application Data

(63) Continuation of application No. 16/121,419, filed on Sep. 4, 2018, now Pat. No. 10,717,482, which is a continuation of application No. 14/777,336, filed as application No. PCT/CA2014/000272 on Mar. 14, 2014, now abandoned.

(60) Provisional application No. 61/794,088, filed on Mar. 15, 2013.

(51) Int. Cl.
B62D 55/24 (2006.01)
(52) U.S. Cl.
CPC .......... B62D 55/244 (2013.01); B62D 55/24 (2013.01)
(58) Field of Classification Search
CPC ............................. B62D 55/244; B62D 55/24
See application file for complete search history.

(56) References Cited

U.S. PATENT DOCUMENTS

| 2,378,427 A | 6/1945 | Myers |
| 3,582,154 A | 6/1971 | Russ |
| 3,858,948 A | 1/1975 | Johnson et al. |
| 5,709,440 A | 1/1998 | Lecours |
| 5,904,217 A * | 5/1999 | Yamamoto ............. B62D 55/14 |
| | | 180/193 |

(Continued)

FOREIGN PATENT DOCUMENTS

| JP | S55119572 | 9/1980 |
| JP | S59118580 | 7/1984 |

(Continued)

OTHER PUBLICATIONS

Examiner Report dated Feb. 3, 2020 in connection with Canadian Patent Application No. 2,906,937, 3 pages.

(Continued)

*Primary Examiner* — Jason R Bellinger
(74) *Attorney, Agent, or Firm* — Hahn Loeser & Parks LLP; Bret A. Hrivnak

(57) ABSTRACT

A track for traction of an off-road vehicle such as an agricultural vehicle, a construction vehicle, a snowmobile, or another vehicle operable off-road. The track is mountable around a track-engaging assembly including a drive wheel for driving the track. The track is elastomeric to be flexible around the track-engaging assembly. The track includes an inner surface for facing the track-engaging assembly, a ground-engaging outer surface for engaging the ground, and a plurality of traction projections projecting from the ground-engaging outer surface. The track may have various features to enhance its traction, its floatation, and/or other aspects relating to use and performance of a track system of the vehicle.

16 Claims, 30 Drawing Sheets

(56) References Cited

U.S. PATENT DOCUMENTS

| | | | |
|---|---|---|---|
| 6,079,802 A * | 6/2000 | Nishimura | B62D 55/244 305/157 |
| 6,241,327 B1 | 6/2001 | Gleasman et al. | |
| 6,406,106 B1 | 6/2002 | Moss | |
| 6,474,755 B1 | 11/2002 | Pringiers | |
| 6,722,746 B2 | 4/2004 | Katayama et al. | |
| 6,923,515 B2 * | 8/2005 | Konickson | B62D 55/096 305/165 |
| 7,014,279 B2 | 3/2006 | Watanabe et al. | |
| 7,044,567 B2 | 5/2006 | Ishibashi | |
| 7,367,637 B2 | 5/2008 | Gleasman | |
| 7,377,601 B2 | 5/2008 | Katoh et al. | |
| 7,784,884 B2 | 8/2010 | Soucy et al. | |
| 8,083,296 B2 | 12/2011 | Dandurand et al. | |
| 8,191,976 B2 | 6/2012 | Sugihara | |
| 8,567,877 B2 | 10/2013 | Ijiri et al. | |
| 8,833,873 B2 | 9/2014 | Dandurand et al. | |
| 9,637,187 B2 | 5/2017 | Okada | |
| 9,694,863 B2 | 7/2017 | Hall | |
| 10,046,818 B1 * | 8/2018 | Wellman | B62D 55/244 |
| 10,392,060 B2 | 8/2019 | Dandurand | |
| D869,988 S | 12/2019 | Degtyarev | |
| D870,594 S | 12/2019 | Dandurand et al. | |
| D881,751 S | 4/2020 | Degtyarev | |
| 10,717,482 B2 * | 7/2020 | Favre | B62D 55/244 |
| 10,953,937 B2 | 3/2021 | Laplante et al. | |
| 11,066,113 B2 * | 7/2021 | Peterson | B62D 55/244 |
| 2003/0214187 A1 * | 11/2003 | Courtemanche | B62D 55/244 305/167 |
| 2004/0178677 A1 | 9/2004 | St-Pierre et al. | |
| 2005/0156466 A1 | 7/2005 | Dandurand et al. | |
| 2006/0273660 A1 | 12/2006 | Dandurand et al. | |
| 2008/0174176 A1 | 7/2008 | Berg | |
| 2009/0085398 A1 * | 4/2009 | Maltais | B62D 55/26 305/178 |
| 2009/0200863 A1 | 8/2009 | Sugihara | |
| 2009/0302677 A1 | 12/2009 | Sugihara | |
| 2011/0037313 A1 | 2/2011 | Delisle et al. | |
| 2011/0169324 A1 | 7/2011 | Ijiri | |
| 2011/0315459 A1 * | 12/2011 | Zuchoski | B62D 55/02 701/1 |
| 2011/0316330 A1 * | 12/2011 | Doyle | B62D 55/06 305/165 |
| 2012/0001478 A1 * | 1/2012 | Zuchoski | B62K 5/01 305/137 |
| 2013/0134772 A1 * | 5/2013 | Dandurand | B62D 55/14 305/178 |
| 2013/0134773 A1 | 5/2013 | Dandurand et al. | |
| 2014/0103704 A1 | 4/2014 | Zuchoski et al. | |
| 2015/0210328 A1 | 7/2015 | Hall | |
| 2016/0016621 A1 | 1/2016 | Favre et al. | |
| 2017/0197677 A1 | 7/2017 | Dandurand et al. | |
| 2019/0061845 A1 | 2/2019 | Delisle et al. | |
| 2019/0106166 A1 | 4/2019 | Favre et al. | |
| 2020/0086935 A1 | 3/2020 | Dandurand et al. | |
| 2021/0078656 A1 | 3/2021 | Dandurand et al. | |

FOREIGN PATENT DOCUMENTS

| | | |
|---|---|---|
| JP | 3416327 | 6/2003 |
| WO | 2006112577 | 10/2006 |
| WO | 2014129659 | 8/2014 |
| WO | 2014138938 | 9/2014 |

OTHER PUBLICATIONS

International Search Report and Written Opinion dated Apr. 4, 2014 in connection with International Patent Application PCT/JP2014/054578, 13 pages.
International Search Report and Written Opinion dated Jul. 2, 2014 in connection with International Patent application PCT/CA2014/000262, 11 pages.
International Search report and written opinion dated Jul. 27, 2016, in connection with International Patent Application PCT/CA2016/050525, 8 pages.
International Search report and written opinion dated Jun. 26, 2014, in connection with International Patent Application PCT/CA2014/000272, 9 pages.
International Search Report and Written Opinion dated Oct. 23, 2007 in connection with International Patent application PCT/KR2005/003191, 9 pages.
Examiner Report dated Nov. 9, 2020 in connection with Canadian Patent Application No. 2,906,937, 4 pages.
Examiner's report dated May 2, 2017 in connection with Canadian Design application No. 169,236, 2 pages.
Examiner's report dated Oct. 24, 2016 in connection with Canadian Design application No. 169,236, 2 pages.
ISR and WO issued on Jul. 27, 2016 for PCT/CA2016/050525, 7 pages.
WO issued on Dec. 20, 2005 for PCT/KR2005/003191, 4 pages.
Industrial Design Certificate of Registration for CA 169236, Registration Date Apr. 1, 2019, 11 pages.
Industrial Design Certificate of Registration for CA 1794571, Registration Date Apr. 1, 2019, 11 pages.
Industrial Design Certificate of Registration for CA 1794572, Registration Date Apr. 1, 2019, 11 pages.

* cited by examiner

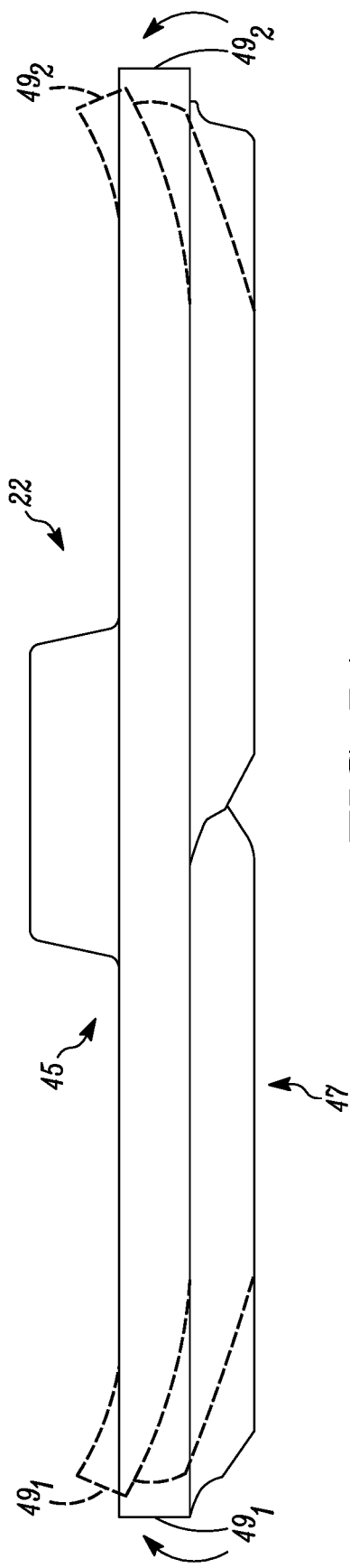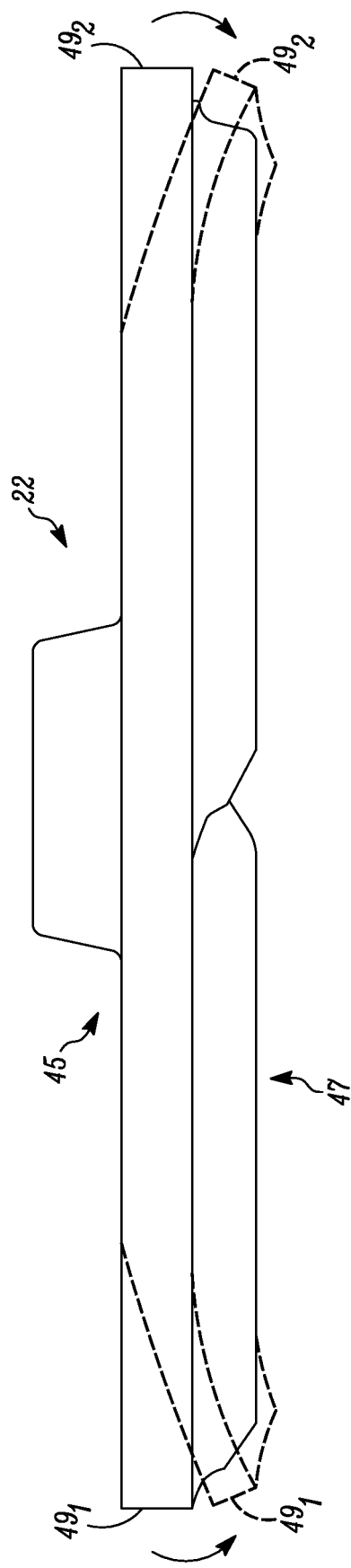

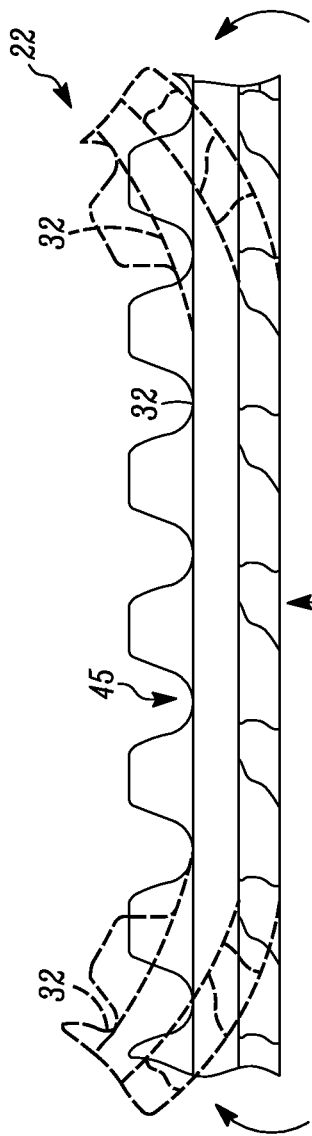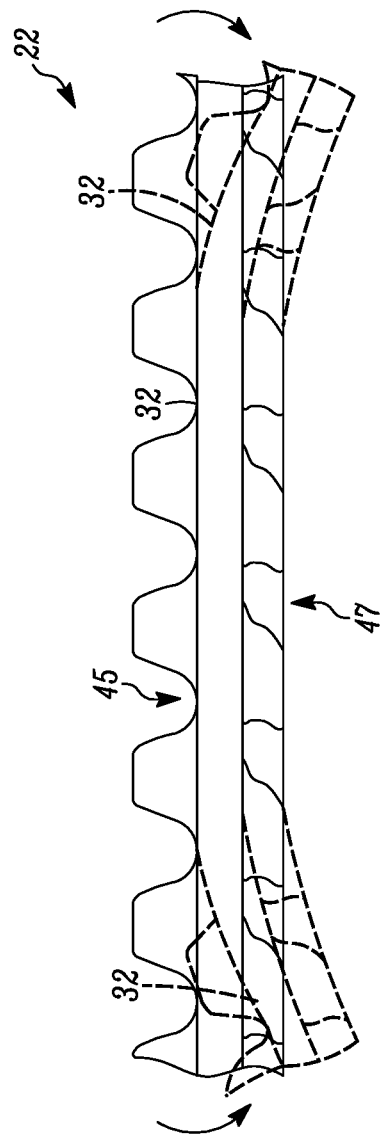

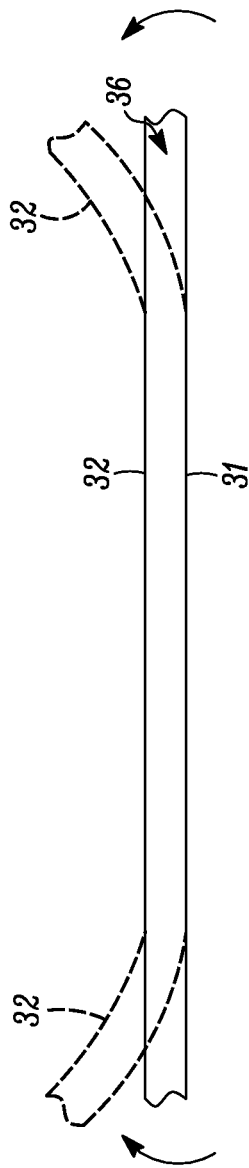
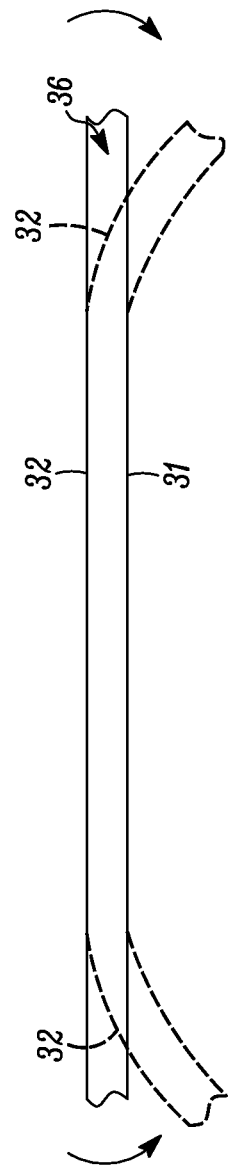

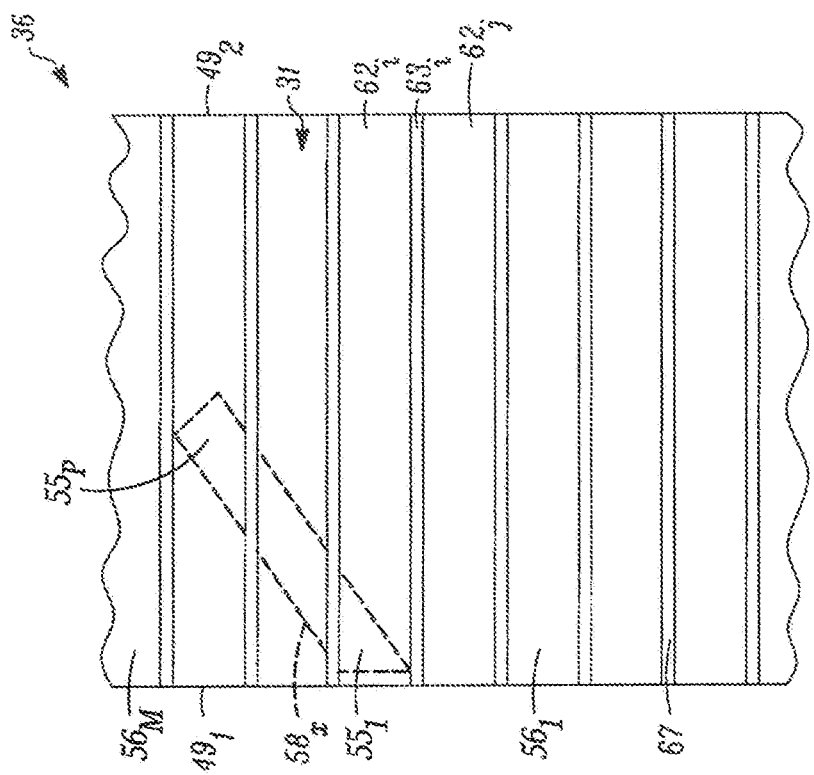
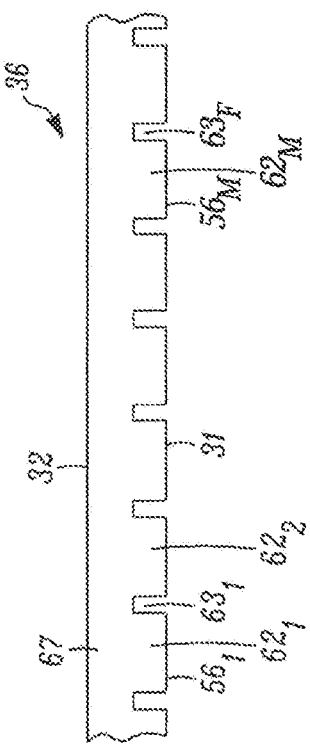

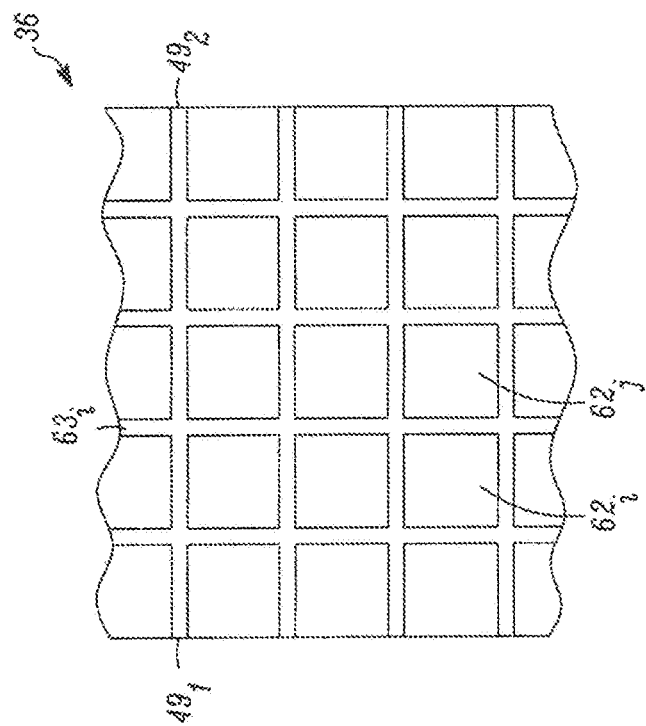
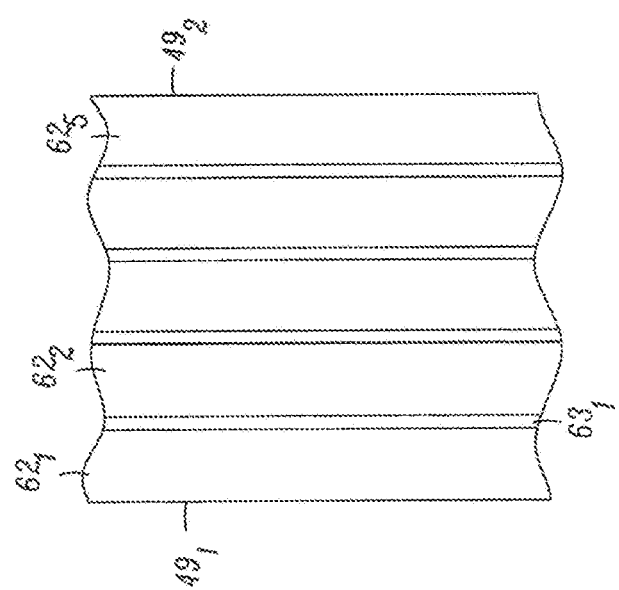

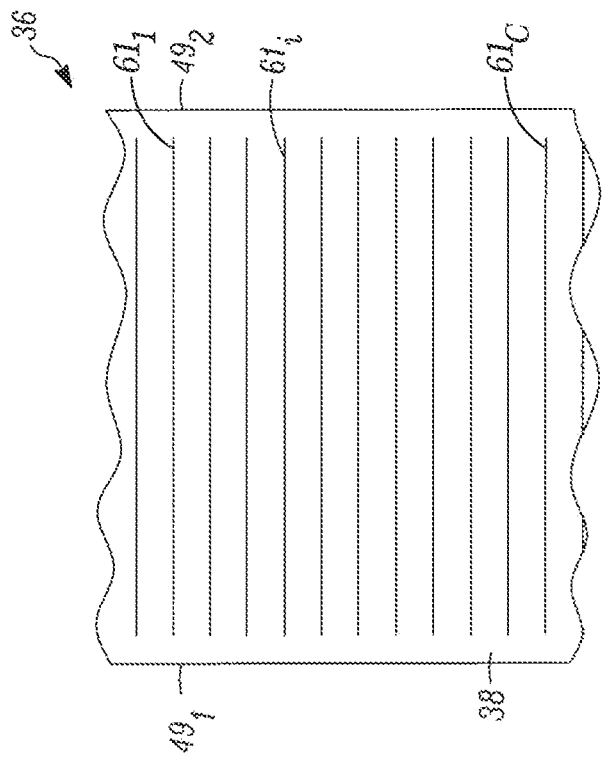
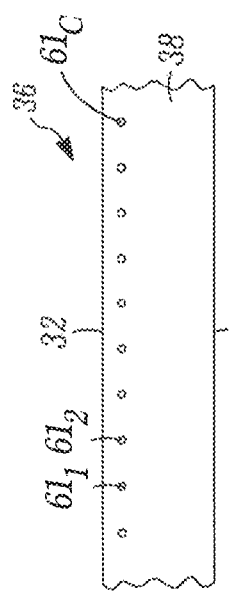

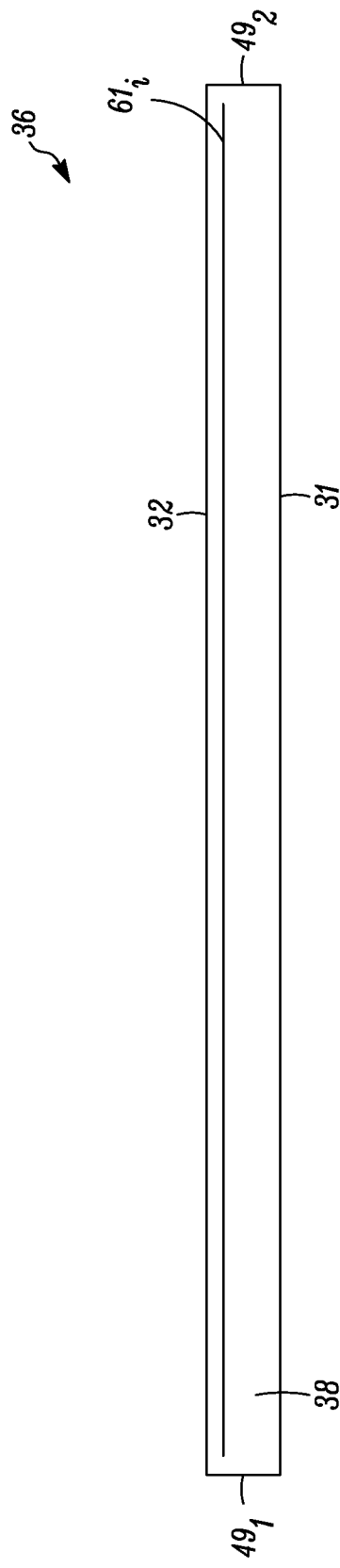
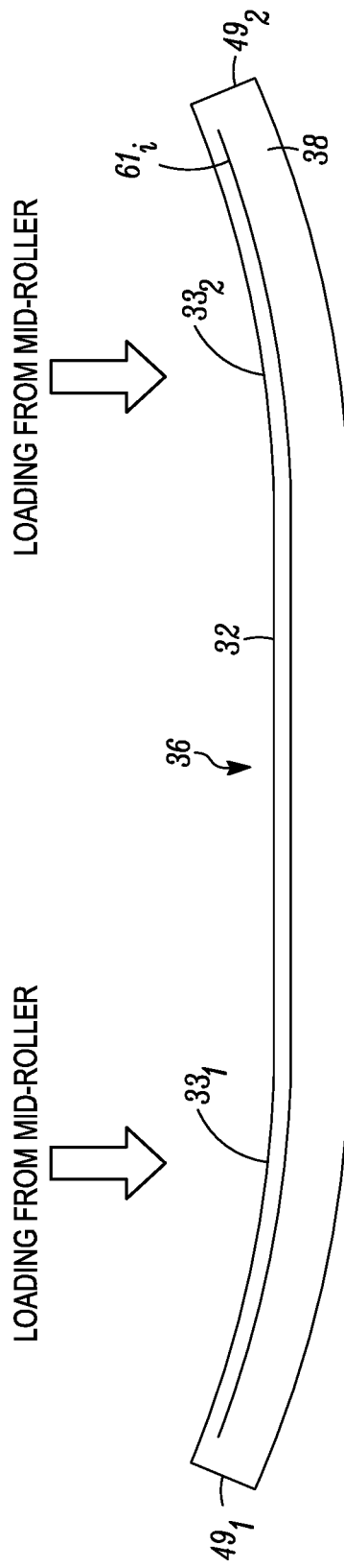
FIG. 25
FIG. 26

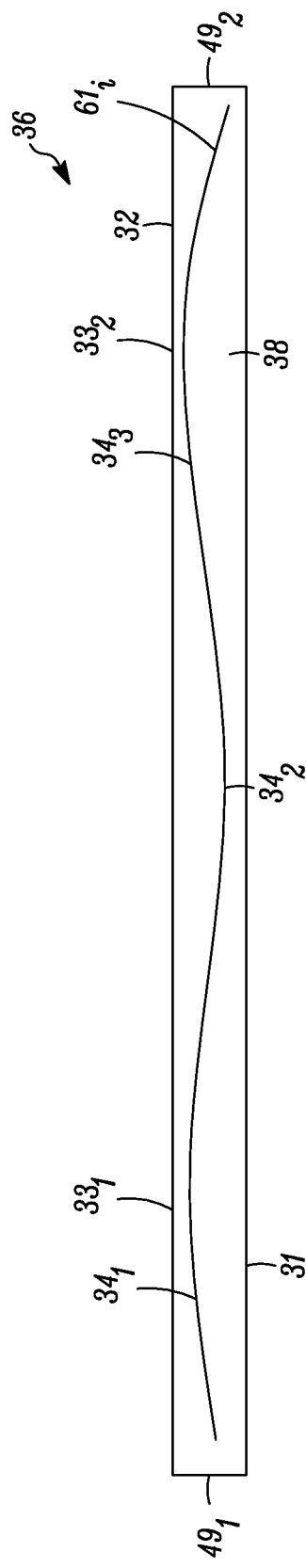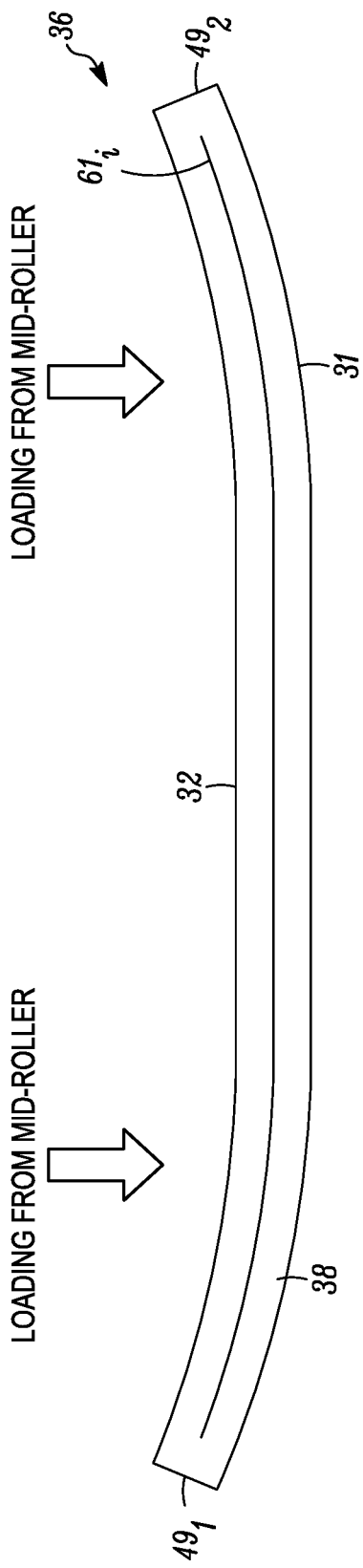

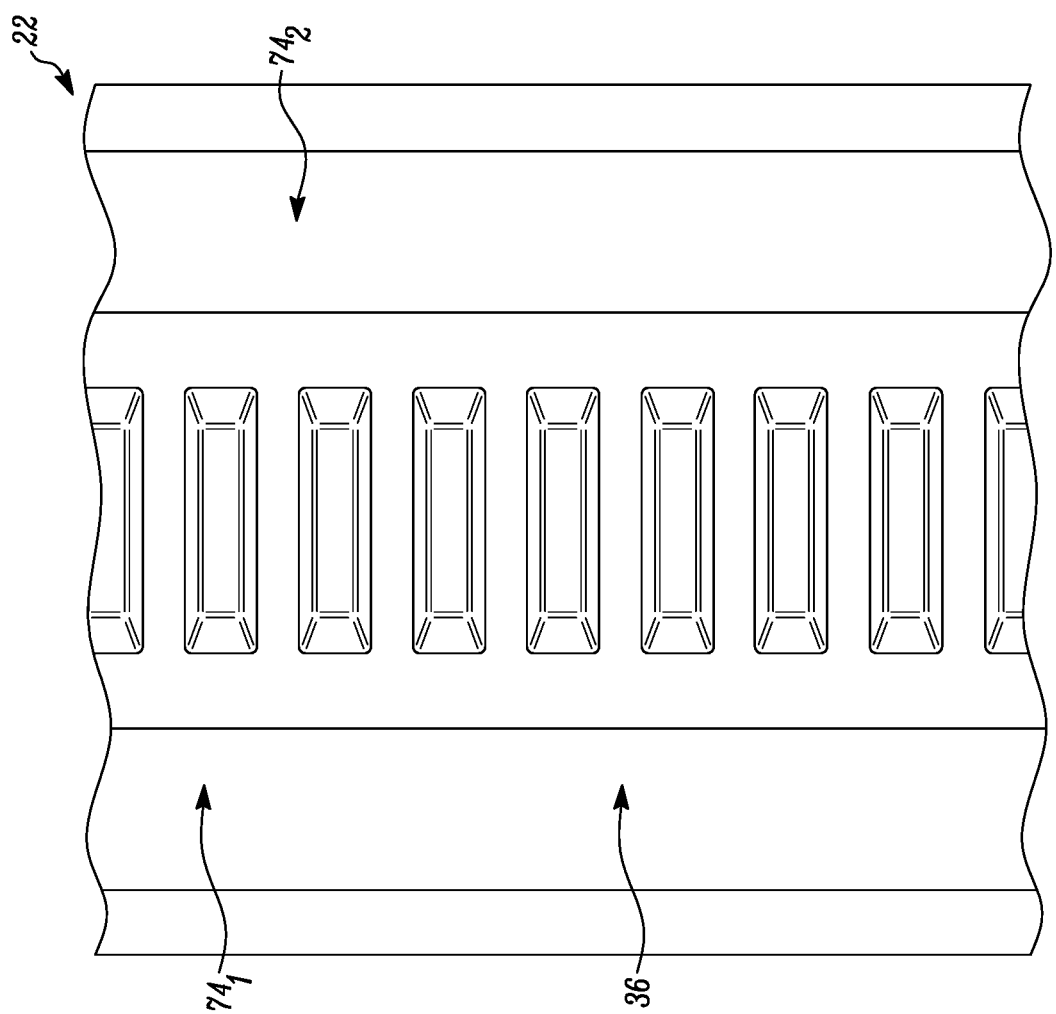

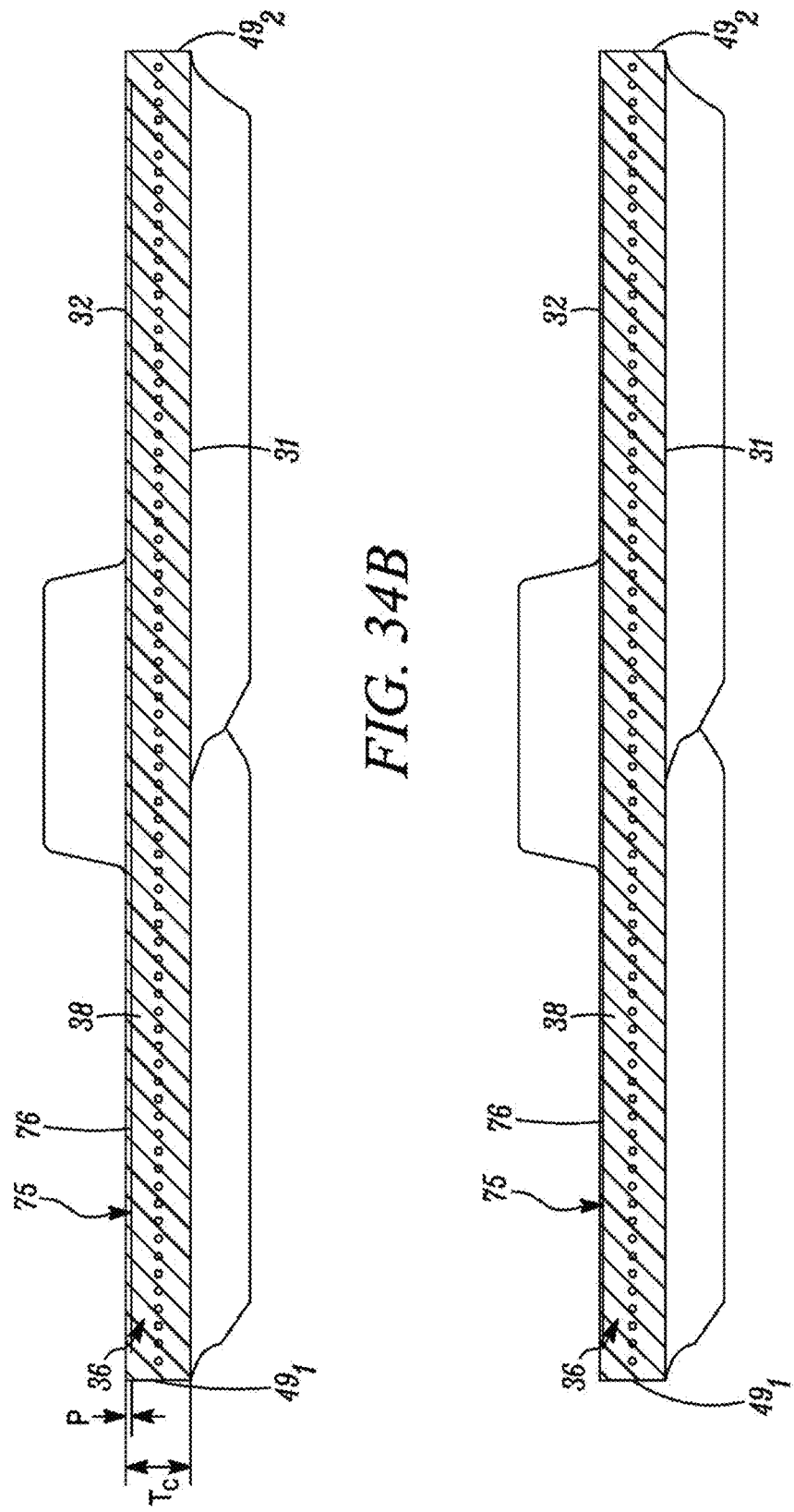

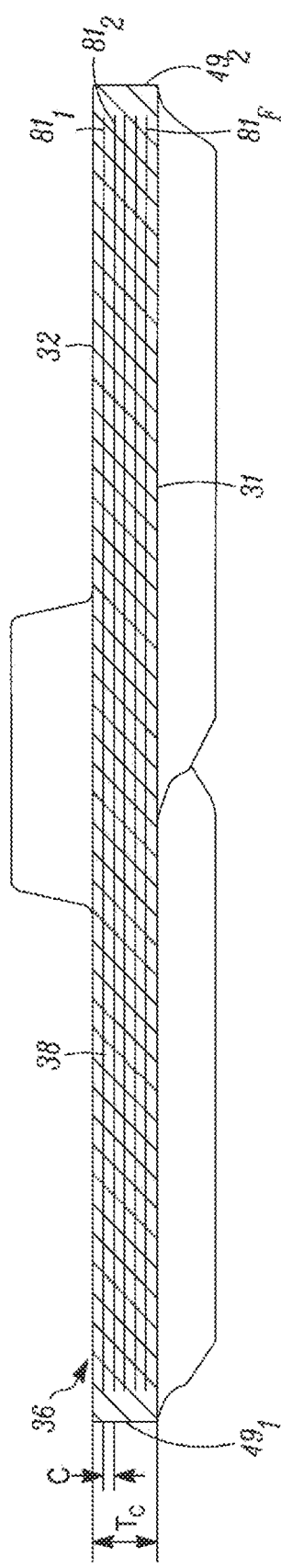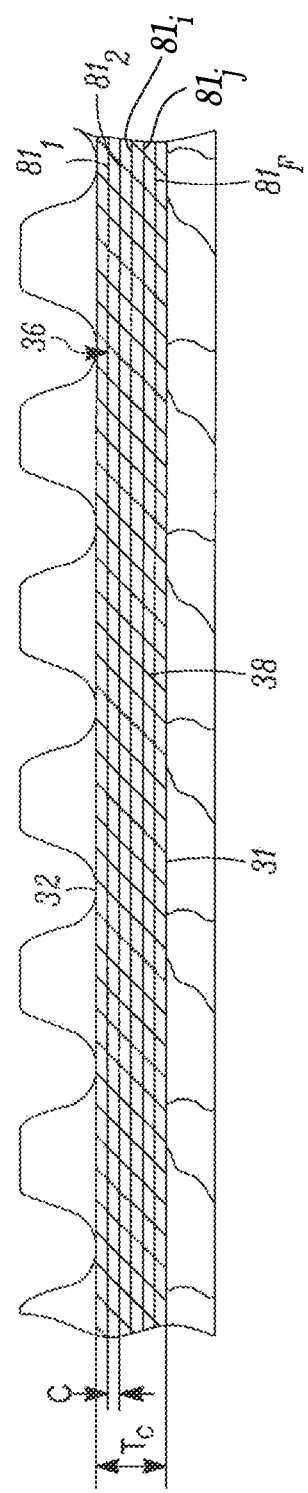

ENDLESS TRACK FOR TRACTION OF A VEHICLE

CROSS-REFERENCE TO RELATED APPLICATION

This application is a continuation application of and claims priority to U.S. application Ser. No. 16/121,419, filed on Sep. 4, 2018, now U.S. Pat. No. 10,717,482, which is a continuation application of 14/777,336, filed on Sep. 15, 2015; which is a National Stage of International Application No. PCT/CA2014/000272, filed on Mar. 14, 2014, which claims priority from U.S. Provisional Patent Application No. 61/794,088, filed on Mar. 15, 2013, the disclosures of which are expressly incorporated by reference herein.

FIELD OF THE INVENTION

The invention generally relates to endless tracks for providing traction to off-road vehicles.

BACKGROUND

Certain off-road vehicles, such as agricultural vehicles (e.g., tractors, harvesters, combines, etc.), construction vehicles (e.g., loaders, bulldozers, excavators, etc.) forestry vehicles (e.g., feller-bunchers, tree chippers, knuckleboom loaders, etc.) and other industrial vehicles, military vehicles (e.g., combat engineering vehicles (CEVs), etc.), snowmobiles, and all-terrain vehicles (ATVs), may be equipped with elastomeric endless tracks which enhance their traction and floatation on soft, slippery and/or irregular grounds (e.g., soil, mud, sand, ice, snow, etc.) on which they operate.

Traction, floatation and other aspects relating to use and performance of tracked vehicles depend on various factors, including the vehicles' tracks. For example, rigidity characteristics as well as resistance to wear, damage or other deterioration of a track can have a significant influence on traction, floatation and other performance aspects of a vehicle propelled by the track.

While track designs have evolved, there remains a need to improve elastomeric endless tracks for traction of vehicles.

SUMMARY OF THE INVENTION

According to an aspect of the invention, there is provided a track for traction of an off-road vehicle. The track is mountable around a track-engaging assembly comprising a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track has an asymmetric rigidity such that the track is stiffer when subject to loading tending to bend the track in a given way than when subject to loading tending to bend the track in an opposite way.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. A widthwise rigidity of the track when subject to loading tending to bend the track inwardly is different from the widthwise rigidity of the track when subject to loading tending to bend the track outwardly.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. A longitudinal rigidity of the track when subject to loading tending to bend the track inwardly is different from the longitudinal rigidity of the track when subject to loading tending to bend the track outwardly.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. The carcass has an asymmetric rigidity such that the carcass is stiffer when subject to loading tending to bend the carcass in a given way than when subject to loading tending to bend the carcass in an opposite way.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. A widthwise rigidity of the carcass when subject to loading tending to bend the carcass inwardly is different from the widthwise rigidity of the carcass when subject to loading tending to bend the carcass outwardly.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. A longitudinal rigidity of the carcass when subject to loading tending to bend the carcass inwardly is different from the longitudinal rigidity of the carcass when subject to loading tending to bend the carcass outwardly.

According to another aspect of the invention, there is provided a track for traction of an off-road vehicle. The track is mountable around a track-engaging assembly comprising a plurality of wheels that includes a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. The carcass is bent in a widthwise direction of the track and deformable in the widthwise direction of the track under loading from respective ones of the wheels.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. The carcass comprises an arrangement of movable zones and movement facilitators disposed between the movable zones. The movable zones are movable relative to one another as the track is driven around the track-engaging assembly.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising elastomeric material, an inner surface for facing the track-engaging assembly, and a ground-engaging outer surface for engaging the ground. The track comprises a plurality of traction projections projecting from the ground-engaging outer surface. The carcass comprises a first reinforcing layer embedded in the elastomeric material between a neutral axis of the carcass and the inner surface and a second reinforcing layer embedded in the elastomeric material between the neutral axis of the carcass and the ground-engaging outer surface and having a different stiffness in a given direction of the track than the first reinforcing layer.

According to another aspect of the invention, there is provided a track for traction of an off-road vehicle. The track is mountable around a track-engaging assembly comprising a plurality of wheels that includes a drive wheel for driving the track. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track comprises a plurality of transversal cables adjacent to one another, extending transversally to a longitudinal direction of the track, and arranged to be in tension under loading from respective ones of the wheels.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly, a ground-engaging outer surface for engaging the ground, elastomeric material, and a reinforcement layer embedded in the elastomeric material. The track comprises a plurality of traction projections projecting from the ground-engaging outer surface. The carcass exhibits a variation of a density of the reinforcement layer in a widthwise direction of the track.

According to another aspect of the invention, there is provided a track for traction of an off-road vehicle. The track is mountable around a track-engaging assembly comprising a plurality of wheels that includes a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. The inner surface comprises a plurality of aligners spaced from one another to align respective areas of the inner surface with respective ones of the wheels and oppose movement of the track relative to the respective ones of the wheels in a widthwise direction of the track.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. The carcass comprises a peripheral reinforcing layer adjacent to a periphery of the carcass.

According to another aspect of the invention, there is provided a track for traction of an off-road vehicle. The track is mountable around a track-engaging assembly comprising a drive wheel for driving the track. The track is elastomeric to be flexible around the track-engaging assembly. The track comprises a carcass comprising an inner surface for facing the track-engaging assembly and a ground-engaging outer surface for engaging the ground. The track comprises a plurality of traction projections projecting from the ground-engaging outer surface. The carcass comprises a multitude of reinforcing fabric layers that are stacked in a thickness direction of the track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 7A and 7B show an example in which the track is easier to bend transversally in a given way than in an opposite way in accordance with an embodiment of the invention;

FIGS. 8A and 8B show an example in which the track is easier to bend longitudinally in a given way than in an opposite way in accordance with an embodiment of the invention;

FIGS. 10A and 10B show an example in which the carcass of the track is easier to bend longitudinally in a given way than in an opposite way in accordance with an embodiment of the invention;

FIGS. 14 to 21 show examples in which the carcass of the track comprises movable zones in accordance with embodiments of the invention;

FIGS. 23 to 30 show examples in which the carcass of the track comprises transversal stiffening cables in accordance with embodiments of the invention;

FIGS. 32 and 33 shows an example in which the track is self-aligning in accordance with an embodiment of the invention;

FIGS. 34B and 35B show examples in which the carcass of the track comprises a peripheral reinforcing layer adjacent to its inner periphery in accordance with embodiments of the invention;

FIGS. 36 and 37 show an example in which the carcass of the track comprises a multitude of reinforcing fabric layers in accordance with an embodiment of the invention; and FIGS. 38 and 39 show other examples in which the carcass of the track exhibits a widthwise variation of density of a reinforcing layer embedded in elastomeric material of the carcass in accordance with other embodiments of the invention.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS OF THE INVENTION

Figure 1:
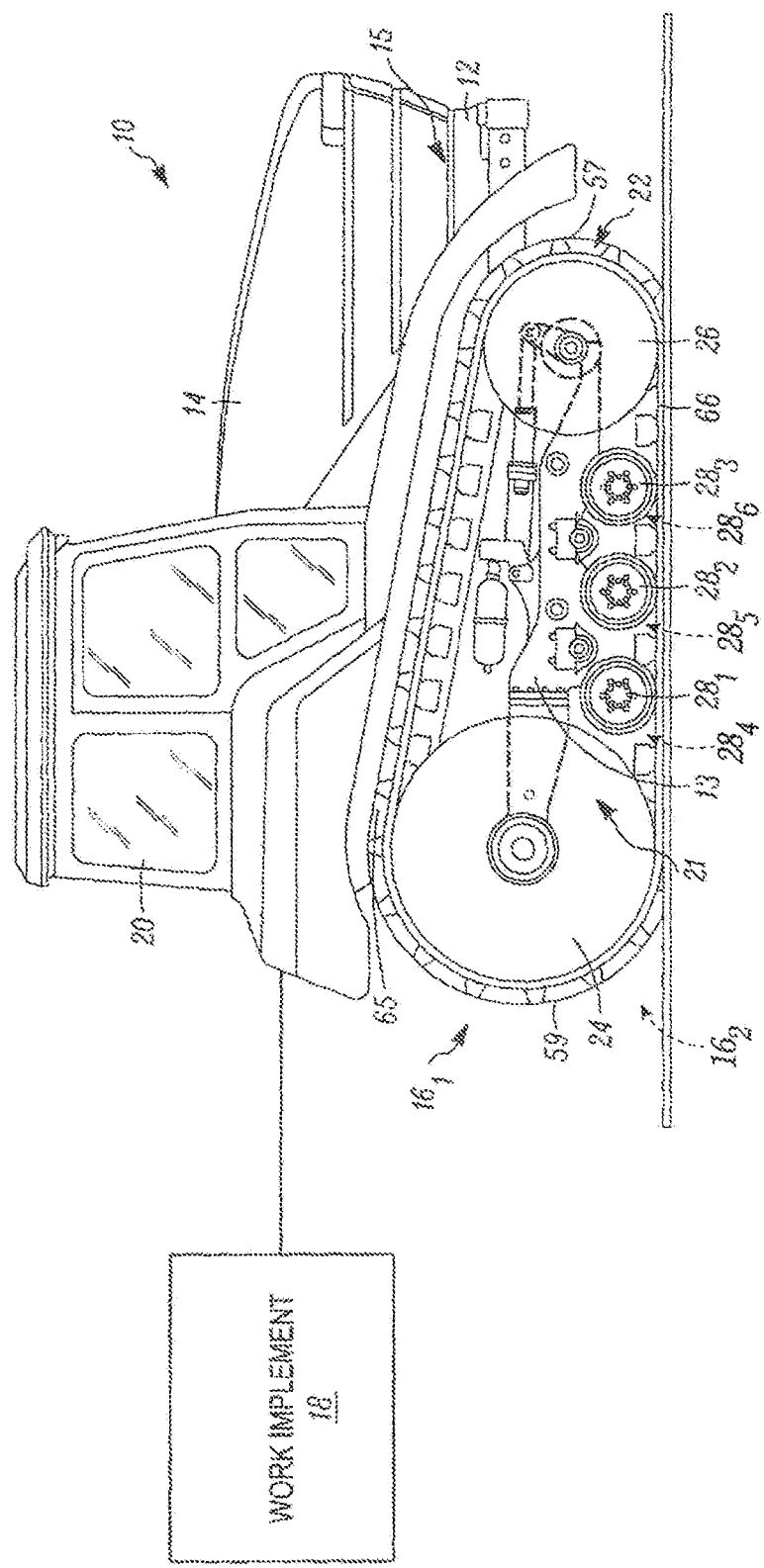
FIG. 1 shows an example of a tracked vehicle in accordance with an embodiment of the invention.
Figure 3:
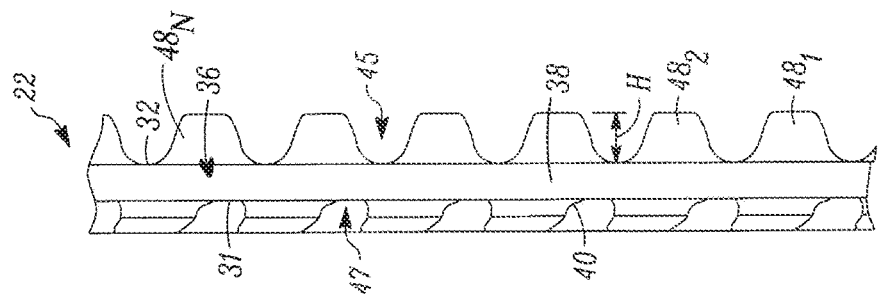
FIGS. 2 to 5C respectively show an outer plan view, a side view, an inner plan view, and cross-sectional views of an example of a track of a track system of the tracked vehicle.
Figure 2:
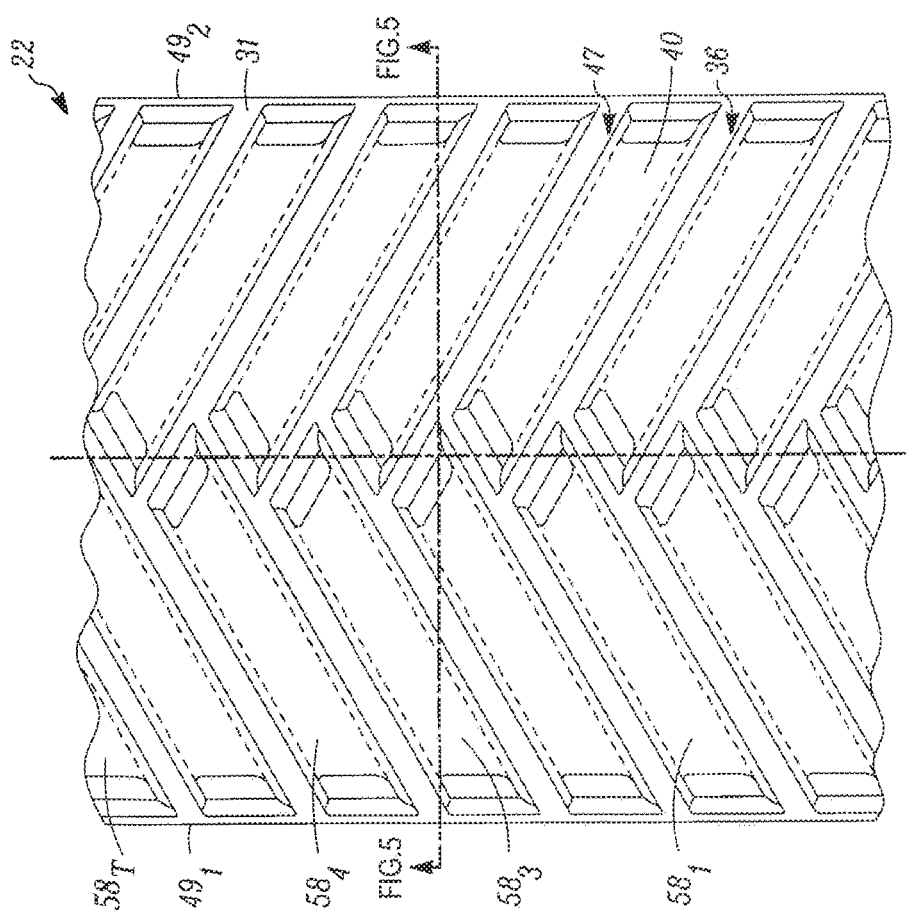
Figure 4:
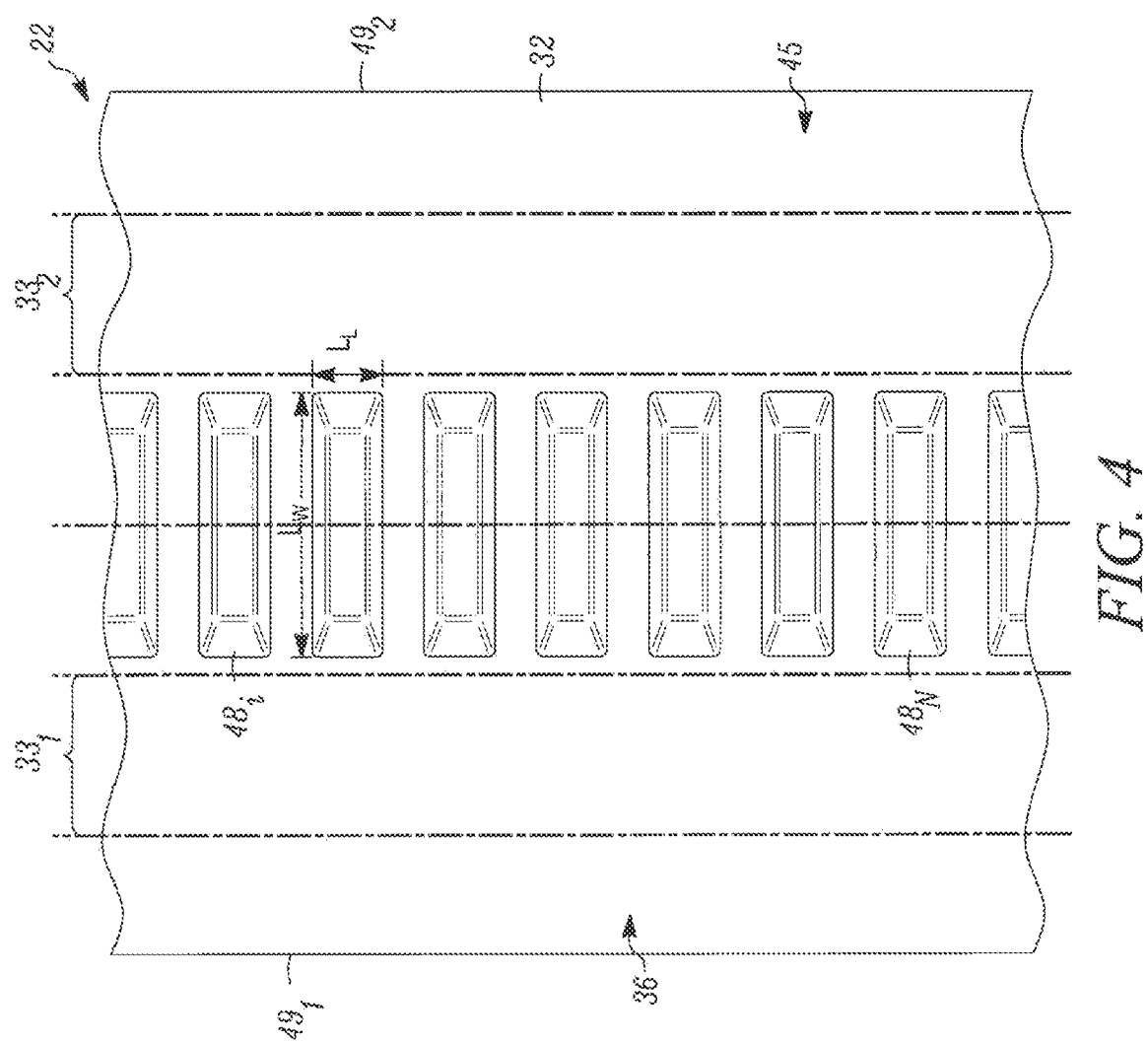
Figure 5A:
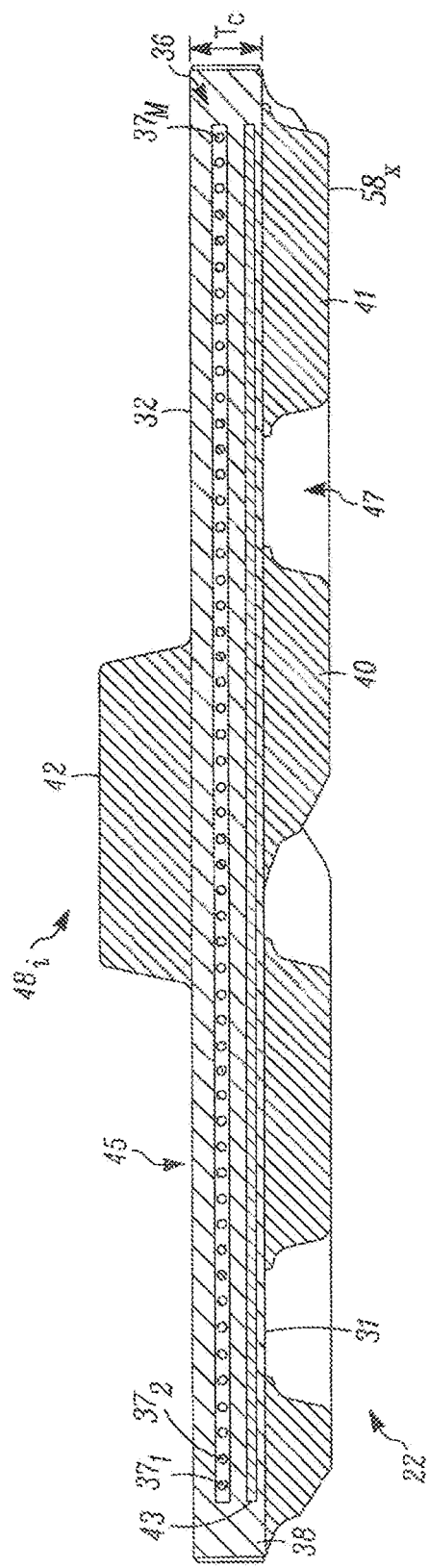
Figure 5B:
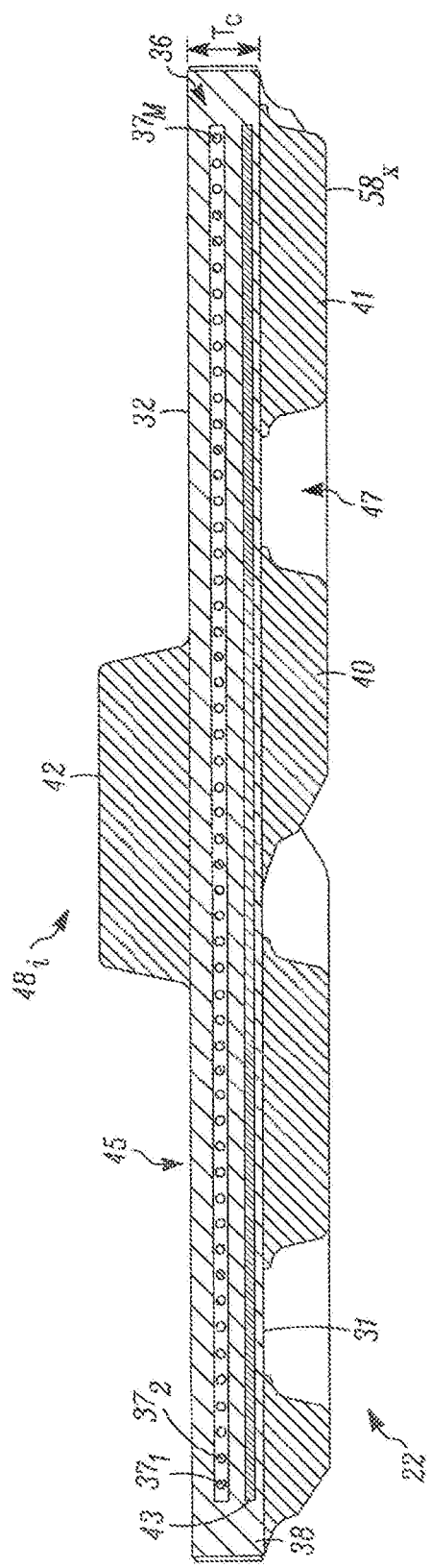
Figure 5C:
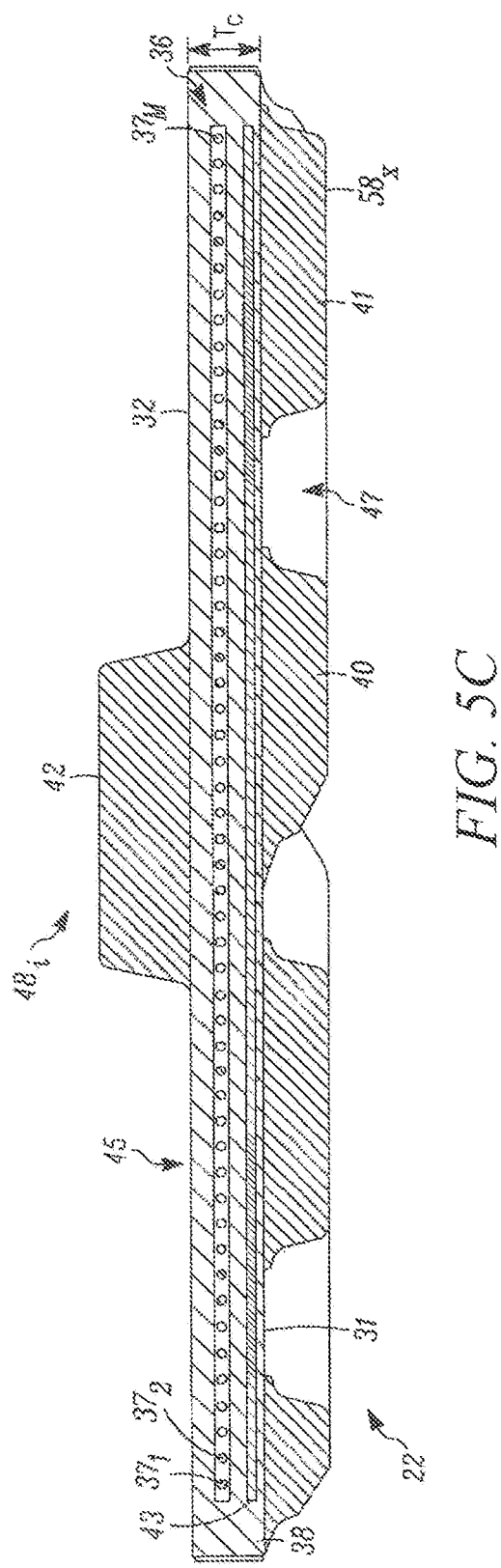

FIG. 1 shows an example of an off-road tracked vehicle 10 in accordance with an embodiment of the invention. In this embodiment, the vehicle 10 is a heavy-duty work vehicle for performing agricultural work, construction work or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12, a powertrain 15, a pair of track systems $16_1$, $16_2$, and an operator cabin 20, which enable an operator to move the agricultural vehicle 10 on the ground to perform agricultural work, possibly using a work implement 18.

The powertrain 15 is configured for generating motive power and transmitting motive power to the track systems 161, 162 to propel the agricultural vehicle 10 on the ground. To that end, the powertrain 15 comprises a prime mover 14, which is a source of motive power that comprises one or more motors (e.g., an internal combustion engine, an electric motor, etc.). For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems $16_1$, $16_2$. That is, the powertrain 15 transmits motive power from the primer mover 14 to the track systems $16_1$, $16_2$ in order to drive (i.e., impart motion to) the track systems $16_1$, $16_2$.

The work implement 18 is used to perform agricultural work. For example, in some embodiments, the work implement 18 may be a combine head, a cutter, a scraper, a tiller or any other type of agricultural work implement.

The operator cabin 20 is where the operator sits and controls the agricultural vehicle 10. More particularly, the operator cabin 20 comprises a set of controls that allow the operator to steer the agricultural vehicle 10 on the ground and operate the work implement 18.

The track systems $16_1$, $16_2$ engage the ground to propel the agricultural vehicle 10. The track system $16_1$ is located on a given lateral side of the vehicle 10, while the track system $16_2$ (not shown) is located on an opposite lateral side of the vehicle 10. In this embodiment, each track system $16_1$, $16_2$ comprises a track-engaging assembly 21 and a track 22 disposed around the track-engaging assembly 21. More particularly, in this embodiment, the track-engaging assembly 21 comprises a plurality of wheels, including a drive wheel 24 and a plurality of idler wheels which includes a front idler wheel 26 and a plurality of roller wheels $28_1$-$28_6$. The track system $16_1$ also comprises a track frame 13 which supports various components of the track system $16_1$, including the roller wheels $28_1$-$28_6$. The track system $16_1$ has a longitudinal direction and a first longitudinal end 57 and a second longitudinal end 59 that define a length of the track system $16_1$. The track system $16_1$ has a widthwise direction and a width that is defined by a width of the track 22. The track system $16_1$ also has a height direction that is normal to its longitudinal direction and its widthwise direction.

The track 22 engages the ground to provide traction to the agricultural vehicle 10. As further discussed below, in various embodiments, the track 22 may have various features to enhance its traction, its floatation, and/or other aspects relating to use and performance of the track system $16_1$.

A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 2 to 5C, the track 22 comprises an inner side 45, a ground-engaging outer side 47, and lateral edges $49_1$, $49_2$. The inner side 45 faces the wheels 24, 26, $28_1$-$28_6$, while the ground-engaging outer side 47 engages the ground. A top run 65 of the track 22 extends between the longitudinal ends 57, 59 of the track system $16_1$ and over the wheels 24, 26, $28_1$-$28_6$, while a bottom run 66 of the track 22 extends between the longitudinal ends 57, 59 of the track system $16_1$ and under the wheels 24, 26, $28_1$-$28_6$. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21. The carcass 36 comprises an inner surface 32 and a ground-engaging outer surface 31 that are opposite one another.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cable $37_1$ (which denotes any one of th reinforcing cables $37_1$, $37_2$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 has a thickness $T_c$, measured from its inner surface 32 to its ground-engaging outer surface 31, which is relatively large in this embodiment. For example, in some embodiments, the thickness $T_c$ of the carcass 36 may be at least than 20 mm, in some cases at least 25 mm, in some cases at least 30 mm, in some cases at least 35 mm, and in some cases even more (e.g., 40 mm or more). The thickness $T_c$ of the carcass 36 may have any other suitable value in other embodiments.

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

In this embodiment, the inner side 45 of the track 22 comprises the inner surface 32 of the carcass 36 and a plurality of inner projections 481-48N that project inwardly from the inner surface 32 and are positioned to contact at least some of the wheels 24, 26, 281-286 to do at least one of driving (i.e., imparting motion to) the track 22 and guiding the track 22. Since each of them is used to do at least one of driving the track 22 and guiding the track 22, the inner projections $48_1$-$48_N$ can be referred to as "drive/guide projections" or "drive/guide lugs". In some cases, a drive/guide lug 48, (which denotes any one of the inner projections $48_1$-$48_N$) may interact with the drive wheel 24 to drive the track 22, in which case the drive/guide lug $48_i$ is a drive lug. In other cases, a drive/guide lug $48_i$ may interact with a given one of the idler wheels 26, $28_1$-$28_6$ to guide the track 22 to maintain proper track alignment and prevent de-tracking without being used to drive the track 22, in which case the drive/guide lug $48_i$, is a guide lug. In yet other cases, a drive/guide lug $48_i$, may both (i) interact with the drive wheel 24 to drive the track 22 and (ii) interact with a given one of the idler wheels 26, $28_1$-$28_6$ to guide the track 22, in which case the drive/guide lug $48_i$ is both a drive lug and a guide lug. In this embodiment, each of the drive/guide lugs $48_1$-$48_N$ is an elastomeric drive/guide lug in that it comprises elastomeric material 42.

The ground-engaging outer side 47 of the track 22 comprises the ground-engaging outer surface 31 of the carcass 36 and a plurality of traction projections $58_1$-$58_T$ that project outwardly from the ground-engaging outer surface 31 to form a tread pattern 40. The traction projections $58_1$-$58_T$, which can be referred to as "traction lugs", may have any suitable shape (e.g., straight shapes, curved shapes, shapes with straight parts and curved parts, etc.). In this embodiment, each of the traction projection $58_1$-$58_T$ is an elastomeric traction projection in that it comprises elastomeric material 41.

The traction projections $58_1$-$58_T$ may be provided on the ground-engaging outer side 47 in various ways. For example, in this embodiment, the traction projections $58_1$-$58_T$ are provided on the ground-engaging outer side 47 by being molded with the carcass 36.

In this embodiment, the inner side 45 of the track 22 comprises the inner surface 32 of the carcass 36 and a plurality of inner projections $48_1$-$48_N$ that project inwardly from the inner surface 32 and are positioned to contact at least some of the wheels 24, 26, $28_1$-$28_6$ to do at least one of driving (i.e., imparting motion to) the track 22 and guiding the track 22. Since each of them is used to do at least one of driving the track 22 and guiding the track 22, the inner projections $48_1$-$48_N$ can be referred to as "drive/guide projections" or "drive/guide lugs". In some cases, a drive/guide lug $48_i$ may interact with the drive wheel 24 to drive the track 22, in which case the drive/guide lug $48_i$ is a drive lug. In other cases, a drive/guide lug $48_i$ may interact with a given one of the idler wheels 26, $28_1$-$28_6$ to guide the track 22 to maintain proper track alignment and prevent de-tracking without being used to drive the track 22, in which case the drive/guide lug $48_i$ is a guide lug. In yet other cases, a drive/guide lug $48_i$ may both (i) interact with the drive wheel 24 to drive the track 22 and (ii) interact with a given one of the idler wheels 26, $28_1$-$28_6$ to guide the track 22, in which case the drive/guide lug $48_i$ is both a drive lug and a guide lug. In this embodiment, each of the drive/guide lugs $48_1$-$48_N$ is an elastomeric drive/guide lug in that it comprises elastomeric material 42.

Each drive/guide lug $48_i$ has a front-to-rear dimension $L_L$ in the longitudinal direction of the track 22 and a side-to-side dimension $L_W$ in the widthwise direction of the track 22. In some cases, the front-to-rear dimension $L_L$ may be a width of the drive/guide lug $48_i$ while the side-to-side dimension $L_W$ may be a length of the drive/guide lug $48_i$. In other cases, the front-to-rear dimension $L_L$ may be a length of the drive/guide lug $48_i$ while the side-to-side dimension $L_W$ may be a width of the drive/guide lug $48_i$. In yet other cases, the front-to-rear dimension $L_L$ and the side-to-side dimension $L_W$ may be substantially the same. The drive/guide lug $48_i$ also has a height H.

The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The drive wheel 24 is rotatable by power derived from the prime mover 14 to drive the track 22. That is, power generated by the prime mover 14 and delivered over the powertrain 15 of the agricultural vehicle 10 can rotate a driven axle, which causes rotation of the drive wheel 24, which in turn imparts motion of the track 22.

Figure 6:
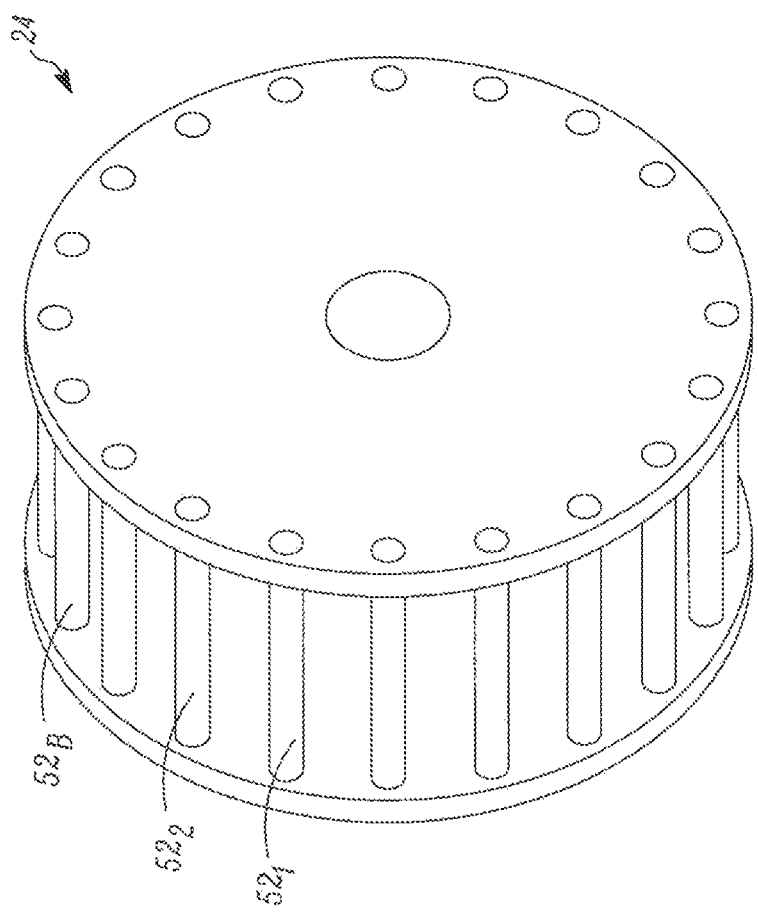
FIG. 6 shows an example of a drive wheel of the track system.

In this embodiment, with additional reference to FIG. 6, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" system. The drive wheel 24 may be configured in various other ways in other embodiments. For example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" system).

The front idler wheel 26 and the roller wheels $28_1$-$28_6$ are not driven by power supplied by the prime mover 14, but are rather used to do at least one of supporting part of a weight of the agricultural vehicle 10 on the ground via the track 22, guiding the track 22 as it is driven by the drive wheel 24, and tensioning the track 22. More particularly, in this embodiment, the front idler wheel 26 is a leading idler wheel which maintains the track 22 in tension and helps to support part of the weight of the agricultural vehicle 10 on the ground via the track 22. The roller wheels $281$_$286$ $r_o$ll on respective ones of a plurality of rolling paths $33_{1_1}$, $33_2$ of the inner surface 32 of the carcass 36 along the bottom run 66 of the track 22 to apply the bottom run 66 on the ground. Each of the rolling paths $33_1$, $33_2$ extends adjacent to the drive/guide lugs $48_1$-$48_N$ to allow these lugs to guide motion of the track 22 around the track-engaging assembly 21. In this case, as they are located between frontmost and rearmost ones of the wheels of the track assembly $161_1$, the roller wheels $28_1$-$28_6$ can be referred to as "mid-rollers".

Various considerations are important when it comes to use and performance of the track system $16_1$, including its track 22. Notably, in various embodiments, the track 22, including its carcass 36, may have various features to enhance its rigidity characteristics, its resistance to wear or other deterioration, and/or other characteristics in order to improve its traction, its floatation, and/or other aspects relating to use and performance of the track system $16_1$. Examples of such features will now be discussed.

1. Enhanced Rigidity Characteristics

In some embodiments, the track 22 may have rigidity (i.e., stiffness) characteristics to provide better load distribution, reduce power consumption, and/or enhance other aspects of the track system $16_1$. For instance, these rigidity characteristics may relate to (1) a longitudinal rigidity of the track 22, i.e., a rigidity of the track 22 in its longitudinal direction which refers to the track's resistance to bending about an axis parallel to its widthwise direction, and/or (2) a widthwise rigidity of the track 22, i.e., a rigidity of the track 22 in its widthwise direction which refers to the track's resistance to bending about an axis parallel to its longitudinal direction.

For example, in some embodiments, the widthwise rigidity of the track 22 may be such that, although it may be flexible in its widthwise direction (e.g., due to its elastomeric nature), the track 22 can be sufficiently rigid in its widthwise direction to properly distribute loading on the track 22 for floatation and traction (e.g., by tending to avoid a situation in which most of the loading on the track 22 is distributed only under and near the mid-rollers $28_1$-$28_6$ with little or no loading being distributed on parts of the track 22 between the mid-rollers $28_1$-$28_6$ and the track's lateral edges $49_1$, $49_2$).

As another example, in some embodiments, the longitudinal rigidity of the track 22 may be such that, although it can flex in its longitudinal direction to move around the track-engaging assembly 21 (e.g., to reduce power consumed to bend it as it turns about the idler wheel 26 and the drive wheel 24), the track 22 can be sufficiently rigid in its longitudinal direction to help maintain a generally straight shape of the bottom run 66 of the track 22 for proper traction).

The rigidity characteristics of the track 22 depend on rigidity characteristics of the carcass 36, including (1) a longitudinal rigidity of the carcass 36, i.e., a rigidity of the carcass 36 in the track's longitudinal direction which refers to the carcass's resistance to bending about an axis parallel to the track's widthwise direction, and (2) a widthwise rigidity of the carcass 36, i.e., a rigidity of the carcass 36 in the track's widthwise direction which refers to the carcass's resistance to bending about an axis parallel to the track's longitudinal direction.

1.1 Asymmetric Rigidity

In some embodiments, the track 22 may have an asymmetric rigidity such that it is easier to bend in a given way than in an opposite way, i.e., it is stiffer when subject to loading tending to bend it in a given way than when subject to loading tending to bend it in an opposite way.

For example, in some embodiments, as shown in FIGS. 7A and 7B, the widthwise rigidity of the track 22 when subject to loading tending to bend the track 22 inwardly (i.e., bend the track 22 such that its lateral edges $49_1$, $49_2$ move in an inward direction oriented from its ground-engaging outer side 47 towards its inner side 45 as shown in FIG. 7A) may be different from the widthwise rigidity of the track 22 when subject to loading tending to bend the track 22 outwardly (i.e., bend the track 22 such that its lateral edges $49_1$, $49_2$ move in an outward direction oriented from its inner side 45 towards its ground-engaging outer side 47 as shown in FIG. 7B).

In some cases, the widthwise rigidity of the track 22 when subject to loading tending to bend the track 22 inwardly may be greater than the widthwise rigidity of the track 22 when subject to loading tending to bend the track 22 outwardly. This may help the track 22 to have a large widthwise extent that is relatively rigid transversally against loading of the mid-rollers $28_1$-$28_6$ to improve traction and floatation. In other cases, the widthwise rigidity of the track 22 when subject to loading tending to bend the track 22 inwardly may be less than the widthwise rigidity of the track 22 when subject to loading tending to bend the track 22 outwardly (e.g., in situations where the width of the track 22 is greater than a row crop spacing in which the track 22 is used, or to facilitate turning).

As another example, in some embodiments, as shown in FIGS. 8A and 8B, the longitudinal rigidity of the track 22 when subject to loading tending to bend the track 22 inwardly (i.e., bend the track 22 such that a flat area of the inner surface 32 of the carcass 36 bends in an inward direction and becomes generally concave as shown in FIG. 8A) may be different from the longitudinal rigidity of the track 22 when subject to loading tending to bend the track 22 outwardly (i.e., bend the track 22 such that a flat area of the inner surface 32 of the carcass 36 bends in an outward direction and becomes generally convex as shown in FIG. 8b).

In some cases, the longitudinal rigidity of the track 22 when subject to loading tending to bend the track 22 inwardly may be less than the longitudinal rigidity of the track 22 when subject to loading tending to bend the track 22 outwardly. This may facilitate bending of the track 22 as it turns about the idler wheel 26 and the drive wheel 24, which may reduce power consumption to drive the track 22. In other cases, the longitudinal rigidity of the track 22 when subject to loading tending to bend the track 22 inwardly may be greater than the longitudinal rigidity of the track 22 when subject to loading tending to bend the track outwardly (e.g., to facilitate conformance to obstacles on the ground or other terrain variations).

To observe the widthwise rigidity and/or the longitudinal rigidity of the track 22, a test can be performed to (1) subject the track 22 to a bending load having a predetermined magnitude and tending to bend the track 22 in a given way (i.e., inwardly or outwardly) and measure a deflection of the track 22 and (2) subject the track 22 to a bending load having the predetermined magnitude and tending to bend the track 22 in an opposite way (i.e., outwardly or inwardly) and measure a deflection of the track 22. If the deflection of the track 22 when subjected to the bending load tending to bent the track 22 in the given way is substantially different from (e.g., at least 10% greater or lower than, in some cases at least 15% greater or lower than, and in some cases at least 20% greater or lower than) the deflection of the track 22 when subjected to the bending load tending to bend the track 22 in the opposite way, the track 22 is deemed to have an asymmetric stiffness with respect to bending in these two ways.

Since the rigidity characteristics of the track 22 depend on the rigidity characteristics of the carcass 36, in some embodiments, the carcass 36 may have an asymmetric rigidity such that it is easier to bend in a given way than in an opposite way, i.e., it is stiffer when subject to loading tending to bend it in a given way than when subject to loading tending to bend it in an opposite way.

Figure 9A:
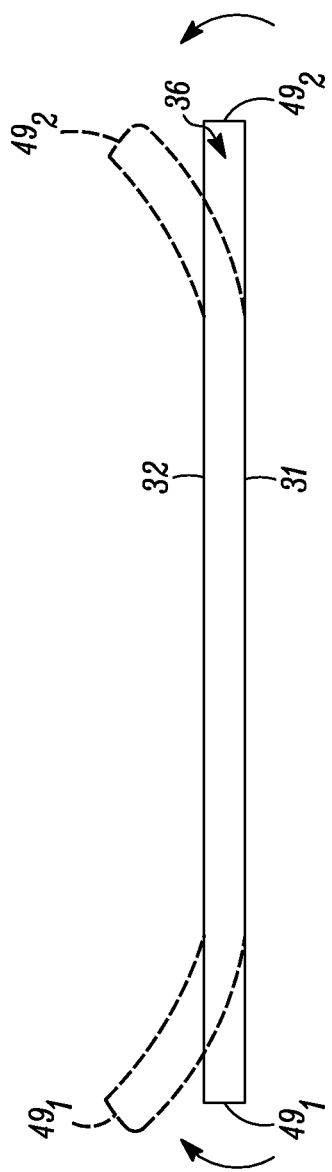
FIGS. 9A and 9B show an example in which a carcass of the track is easier to bend transversally in a given way than in an opposite way in accordance with an embodiment of the invention.
Figure 9B:
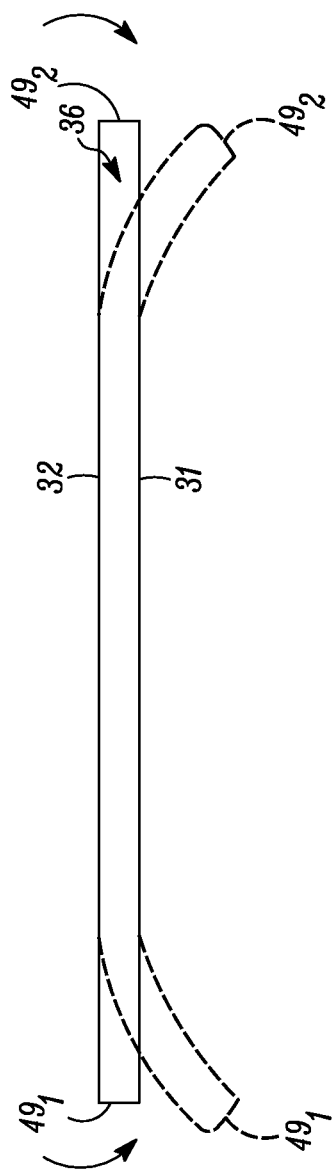

For example, in some embodiments, as shown in FIGS. 9A and 9B, the widthwise rigidity of the carcass 36 when subject to loading tending to bend the carcass 36 inwardly (i.e., bend the carcass 36 such that the lateral edges $49_1$, $49_2$ of the track 22 move in an inward direction oriented from its ground-engaging outer surface 31 towards its inner surface 32 as shown in FIG. 9A) may be different from the widthwise rigidity of the carcass 36 when subject to loading tending to bend the carcass 36 outwardly(i.e., bend the carcass 36 such that the lateral edges $49_1$, $49_2$ of the track 22 move in an outward direction oriented from its inner surface 32 towards its ground-engaging outer surface 31 as shown in FIG. 9B).

In some cases, the widthwise rigidity of the carcass 36 when subject to loading tending to bend the carcass 36 inwardly may be greater than the widthwise rigidity of the carcass 36 when subject to loading tending to bend the carcass 36 outwardly. In other cases, the widthwise rigidity of the carcass 36 when subject to loading tending to bend the carcass 36 inwardly may be less than the widthwise rigidity of the carcass 36 when subject to loading tending to bend the carcass 36 outwardly.

As another example, in some embodiments, as shown in FIGS. 10A and 10B, the longitudinal rigidity of the carcass 36 when subject to loading tending to bend the carcass 36 inwardly (i.e., bend the carcass 36 such that a flat area of the inner surface 32 of the carcass 36 bends in an inward direction and becomes generally concave as shown in FIG. 10A) may be different from the longitudinal rigidity of the carcass 36 when subject to loading tending to bend the carcass 36 outwardly (i.e., bend the carcass 36 such that a flat area of the inner surface 32 of the carcass 36 bends in an outward direction and becomes generally convex as shown in FIG. 10B).

In some cases, the longitudinal rigidity of the carcass 36 when subject to loading tending to bend the carcass 36 inwardly may be less than the longitudinal rigidity of the carcass 36 when subject to loading tending to bend the carcass 36 outwardly. In other cases, the longitudinal rigidity of the carcass 36 when subject to loading tending to bend the carcass 36 inwardly may be greater than the longitudinal rigidity of the carcass 36 when subject to loading tending to bend the carcass 36 outwardly.

To observe the widthwise rigidity and/or the longitudinal rigidity of the carcass 36 (without influence from a remainder of the track 22), a test can be performed to: (1) isolate the carcass 36 from a remainder of the track 22 (e.g., by scraping, cutting or otherwise removing the traction projections $58_1$-$58_T$ and the drive/guide lugs $48_1$-$48_N$, or by producing the carcass 36 without the traction projections $58_1$-$58_T$ and the drive/guide lugs $48_1$-$48_N$); (2) subject the carcass 36 to a bending load having a predetermined magnitude and tending to bend the carcass 36 in a given way (i.e., inwardly or outwardly) and measure a deflection of the carcass 36; (3) subject the carcass 36 to a bending load having the predetermined magnitude and tending to bend the carcass 36 in an opposite way (i.e., outwardly or inwardly) and measure a deflection of the carcass 36. If the deflection of the carcass 36 when subjected to the bending load tending to bent the carcass 36 in the given way is substantially different from (e.g., at least 10% greater or lower than, in some cases at least 15% greater or lower than, and in some cases at least 20% greater or lower than) the deflection of the carcass 36 when subjected to the bending load tending to bend the carcass 36 in the opposite way, the carcass 36 is deemed to have an asymmetric stiffness with respect to bending in these two ways.

1.1.1 Bent Carcass Formed During Manufacturing

Figure 11:
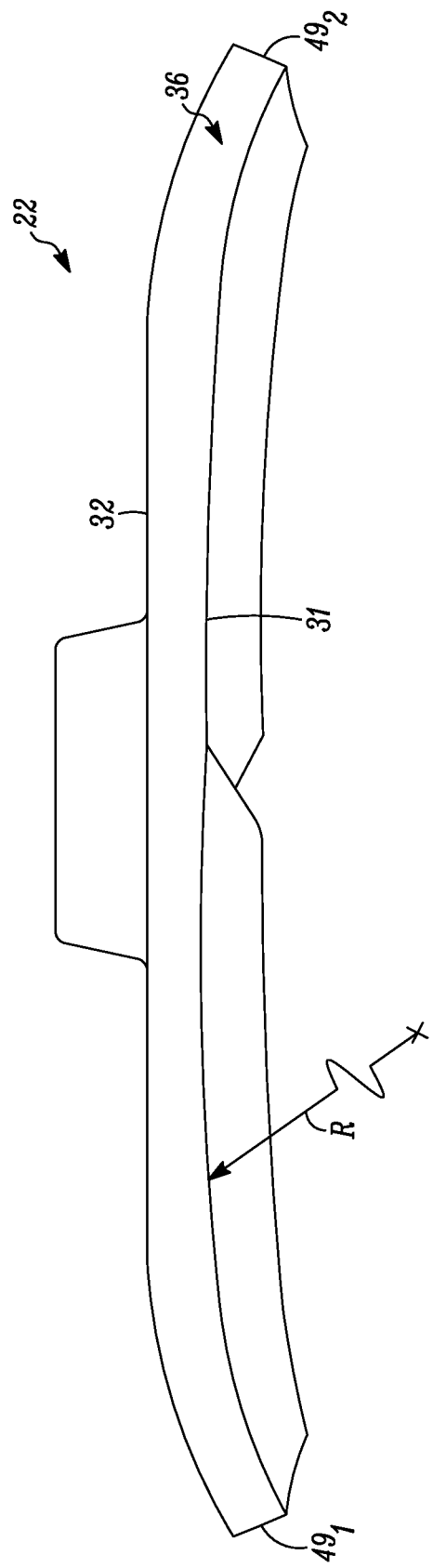
FIGS. 11 to 13 show examples in which the carcass of the track is manufactured bent in accordance with embodiments of the invention.

In some embodiments, as shown in FIG. 11, the carcass 36 of the track 22 may be manufactured such that the carcass 36 is bent (i.e., non-planar) in the widthwise direction of the track 22 and deformable (i.e., changeable in shape) in the widthwise direction of the track 22 under loading from respective ones of the wheels 24, 26, $28_1$-$28_6$. That is, a cross-section of the carcass 36 (normal to the longitudinal axis 19 of the track 22) has a bent shape imparted during manufacturing of the track 22 and acquires a different shape when loaded by respective ones of the wheels 24, 26, $28_1$-$28_6$. This different shape of the cross-section of the carcass 36 may provide better load distribution onto the ground. For instance, this different shape of the cross-section of the carcass 36 may result in the track 22 having a wider ground-contacting area and being stiffer in its widthwise direction due to an increased widthwise tension induced in its ground-engaging outer side 47. In some cases, the cross-section of the carcass 36 may regain its bent shape when no longer loaded by respective ones of the wheels 24, 26, $28_1$-$28_6$ (i.e., a spring-like effect) such that its deformation is elastic.

Figure 12:
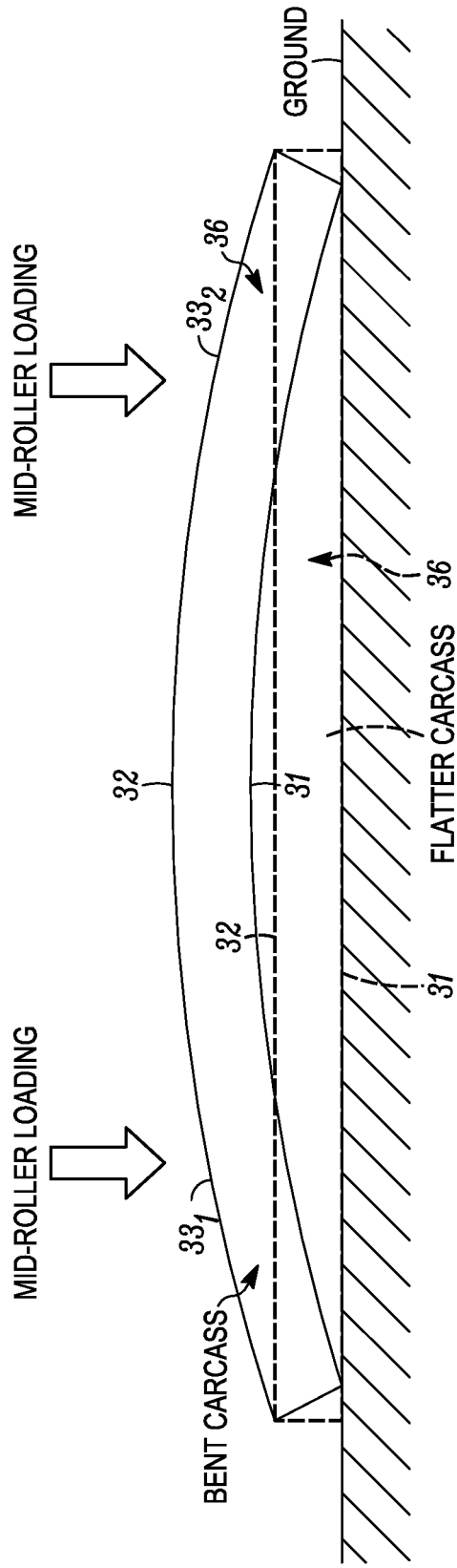

For example, in this embodiment, with additional reference to FIG. 12, the carcass 36 flattens in the widthwise direction of the track 22 under loading from the mid-rollers $28_1$-$28_6$. The cross-section of the carcass 36 thus acquires a flatter shape (i.e., a shape that is more flat than the bent shape) when loaded by the mid-rollers $28_1$-$28_6$.

The carcass 36 may be bent in the widthwise direction of the track 22 by being curved and/or angular (i.e., having at least one angle) in the track's widthwise direction. The bent shape of the cross-section of the carcass 36 is thus curved and/or angular, i.e., it comprises a curved portion and/or an angular portion, between the track's lateral edges $49_1$, $49_2$. The cross-section of the carcass 36 is therefore nonrectangular.

In this embodiment, the carcass 36 is bent in the widthwise direction of the track 22 such that its inner surface 32 is generally convex and its ground-engaging outer surface 31 is generally concave. Under loading from the mid-rollers $28_1$-$28_6$ on the rolling paths $33_1$, $33_2$, the carcass 36 flattens such that its inner surface 32 and its ground-engaging outer surface 31 become flatter. This flattening of the carcass 36 generates an increased tension in the ground-engaging outer side 47 of the track 22, which, along with a resulting wider ground-contacting area, may help to better distribute loading onto the ground.

More particularly, in this embodiment, the carcass 36 is bent in the widthwise direction of the track 22 by being curved in that widthwise direction. A radius of curvature R of the carcass 36 in the track's widthwise direction may have any suitable value. For example, in some embodiments, the radius of curvature R of the carcass 36 may be greater than the width of the track 22, such as in some cases at least twice the width of the track 22, in some cases at least five times of the width of the track 22, in some cases at least ten times of the width of the track 22, in some cases at least 20 times the width of the track 22, and in some cases even more (e.g., 40 times or more the width of the track 22). For instance, in some embodiments, the radius of curvature R of the carcass 36 in the track's widthwise direction may be between 100 inches and 2000 inches, in some cases between 150 inches and 1800 inches, and in some cases between 200 inches and 1600 inches. The radius of curvature R of the carcass 36 may have any other value in other embodiments.

Figure 13:
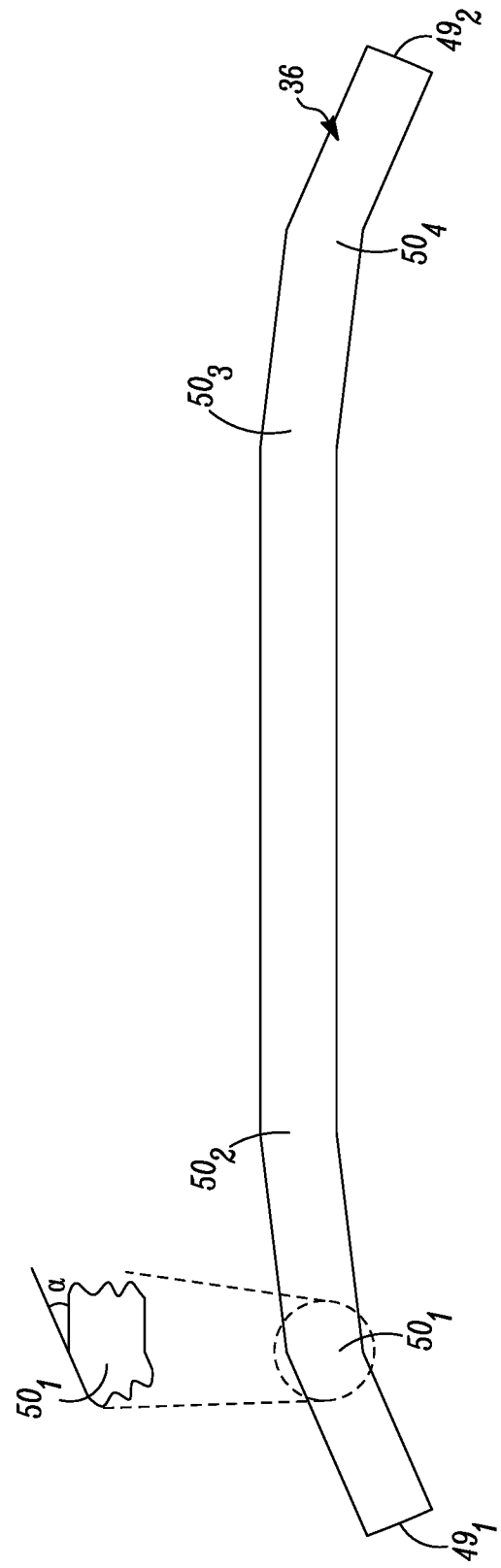

The carcass 36 may be bent in the widthwise direction of the track 22 in various other ways in other embodiments. For example, in some embodiments, instead of or in addition to being curved, the cross-section of the carcass 36 may comprise angular portions to make the carcass's inner surface 32 generally convex and the carcass's ground-engaging outer surface 31 generally concave. FIG. 13 shows an embodiment in which the cross-section of the carcass 36 comprises angular portions $50_1$-$50_4$ each defining a bend angle a between adjacent flat areas of the inner surface 32 of the carcass 36. For instance, in various examples of implementation, the bend angle a may be at least 2°, in some cases at least 5°, in some cases at least 10°, and in some cases even more (e.g., 15° or more). The bend angle a may have any other value in other embodiments.

While in embodiments considered above the cross-section of the carcass 36 deforms in the widthwise direction of the track 22 under loading from the mid-rollers $28_1$-$28_6$, in other embodiments, the cross-section of the carcass 36 may be deformable in the widthwise direction of the track 22 to provide better load-distribution onto the ground under loading from other track-engaging elements (e.g., slide rails) of the track-engaging assembly 21 that engage the bottom run 66 of the track 22.

1.1.2 Carcass Comprising Movable Zones

In some embodiments, as shown in FIGS. 14 and 15, the carcass 36 may comprise an arrangement of movable zones $62_1$-$62_M$ that are movable relative to one another as the track 22 is driven around the track-engaging assembly 21. This relative movement is such that the arrangement of movable zones $62_1$-$62_M$ is expandable and contractible as the track 22 is driven around the track-engaging assembly 21 and the carcass 36 is easier to bend in a given way than in an opposite way. More particularly, in this embodiment, the movable zones $62_1$-$62_M$ can move relative to one another such that the longitudinal rigidity of the carcass 36 when subject to loading tending to bend the carcass 36 inwardly is less than the longitudinal rigidity of the carcass 36 when subject to loading tending to bend the carcass 36 outwardly. This makes it easier to bend the carcass 36 as it turns about the idler wheel 26 and the drive wheel 24, thereby reducing power consumption to drive the track 22, while helping to maintain the bottom run 66 of the track 22 generally straight for proper traction.

Movement facilitators $63_1$, $63_2$-$63_F$ are disposed between adjacent ones of the movable zones $62_1$-$62_M$ to facilitate movement of the movable zones $62_1$-$62_M$ relative to one another. Adjacent movable zones $62_i$, $62_j$ (which denote any adjacent movable zones of the movable zones $62_1$, $62_2$, $62_3$-$62_M$, such as $62_5$) are easier to move relative to one another in a given way than in an opposite way. For example, in this embodiment, the adjacent movable zones $62_i$, $62_j$ are easier to move away from one another than towards one another. In other embodiments, the adjacent movable zones $62_i$, $62_j$ may be easier to move towards one another than away from one another.

In this embodiment, the movable zones $62_1$-$62_M$ are exposed such that they are visible. More particularly, in this embodiment, the movable zones $62_1$-$62_M$ comprise respective portions $56_1$-$56_m$ of the ground-engaging outer surface 31 of the carcass 36 from which project certain ones of the traction projections $58_1$-$58_T$. Since in this example a traction projection $58_x$ (which denotes any one of the traction projections $58_1$-$58_T$, such as $58_3$, $58_4$) (shown in dotted outline in FIG. 15) extends obliquely to the longitudinal direction of the track 22, two or more portions $55_1$-$55_p$ of the traction projection $58_x$ may project from adjacent ones of the movable zones $62_1$-$62_M$ such that, when these adjacent movable zones are located in the bottom run 66 of the track 22, the two or more portions $55_1$-$55_p$ of the traction projection $58_x$, are aligned with one another to form the traction projection $58_x$. For instance, in some cases, the two or more portions $55_1$-$55_p$ of the traction projection $58_x$ may become contiguous when these adjacent movable zones are located in the bottom run 66 of the track 22. In other embodiments, the movable zones $62_1$-$62_m$, rather than be exposed, may be hidden internally within the carcass 36 (e.g., the ground-engaging outer surface 31 of the carcass 36 may be formed by a layer of elastic material covers the movable zones $62_1$-$62_M$ and the movement facilitators $63_1$-$63_F$).

Figure 16:
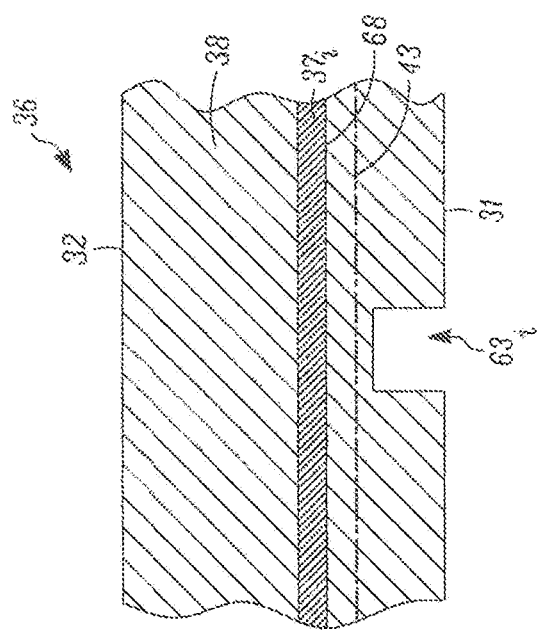

The movable zones $62_1$-$62_M$ are interconnected such that they remain together as a unit. In this embodiment, an elastomeric layer 67 of the carcass 36 interconnects the movable zones $62_1$-$62_M$. More particularly, in this embodiment, the elastomeric layer 67 extends between the movable zones $62_1$-$62_M$ and the inner surface 32 of the carcass 36. Also, in this embodiment, as shown in FIG. 16, reinforcements of the carcass 36, namely the reinforcing cables $37_1$-$37_M$ and the reinforcing fabric 43, are embedded in the elastomeric layer 67.

In this embodiment, the movable zones $62_1$-$62_M$ are exposed such that they are visible. More particularly, in this embodiment, the movable zones $62_1$-$62_M$ comprise respective portions $56_1$-$56_M$ of the ground-engaging outer surface 31 of the carcass 36 from which project certain ones of the traction projections $58_1$-$58_T$. Since in this example a traction projection $58_x$ (shown in dotted outline in FIG. 15) extends obliquely to the longitudinal direction of the track 22, two or more portions $55_1$-$55_P$ of the traction projection $58_x$ may project from adjacent ones of the movable zones $62_1$-$62_M$ such that, when these adjacent movable zones are located in the bottom run 66 of the track 22, the two or more portions $55_1$-$55_P$ of the traction projection $58_x$ are aligned with one another to form the traction projection $58_x$. For instance, in some cases, the two or more portions $55_1$-$55_P$ of the traction projection $58_x$ may become contiguous when these adjacent movable zone are located in the bottom run 66 of the track 22. In other embodiments, the movable zones $62_1$-$62_M$, rather than be exposed, may be hidden internally within the carcass 36 (e.g., the ground-engaging outer surface 31 of the carcass 36 may be formed by a layer of elastic material covers the movable zones $62_1$-$62_M$ and the movement facilitators $63_1$-$63_F$).

The movable zones $62_1$-$62_M$ may be provided in various ways. For example, in some embodiments, the movable zones $62_1$-$62_M$ may be molded by forming the gaps $63_1$-$63_F$ while molding the track 22. In other embodiments, the movable zones $62_1$-$62_M$ may be formed after molding of the track 22 (e.g., by cutting, carving or otherwise removing rubber at locations where the gaps $63_1$-$63_F$ are to be formed).

The arrangement of movable zones $62_1$-$62_M$ may be configured in various other ways in other embodiments.

Figure 17:
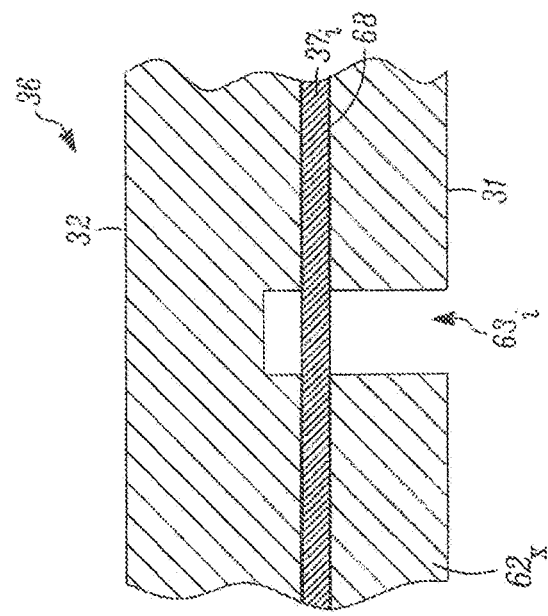

For example, in some embodiments, one or more of the reinforcements of the carcass 36, such as the reinforcing cables $37_1$-$37_M$ and/or the reinforcing fabric 43, may be embedded in the movable zones $62_1$-$62_M$ and move in relation to the movable zones $62_1$-$62_M$ when these zones move relative to one another. For instance, as shown in Figure 17, in some embodiments, a movable zone $62_x$ (which denotes any one of the movable zones $62_1$-$62_M$) may comprise a channel 68 allowing movement of the reinforcing cables $37_1$-$37_M$ relative to that zone. The channel 68 may include a lining (e.g., a sleeve) in which the reinforcing cables $37_1$-$37_m$ can slide relative to the movable zone $62_x$.

Figure 19:
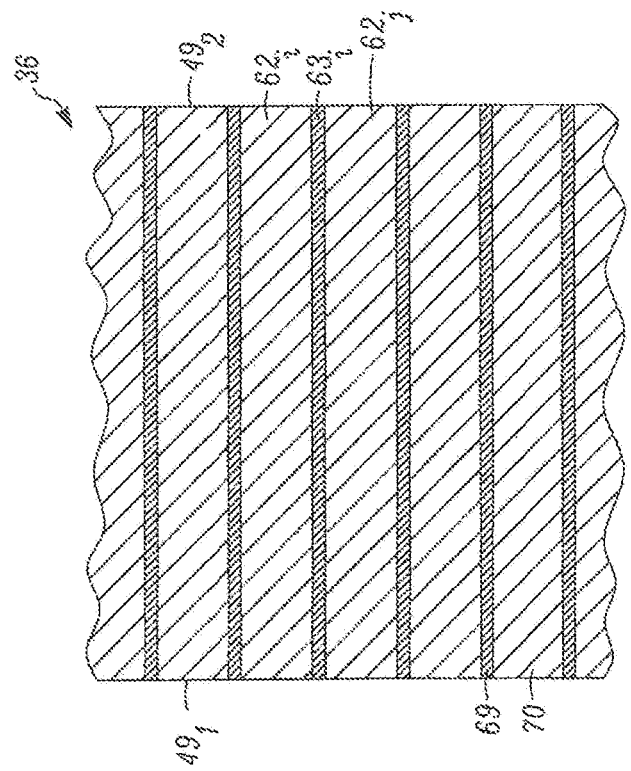
Figure 18:
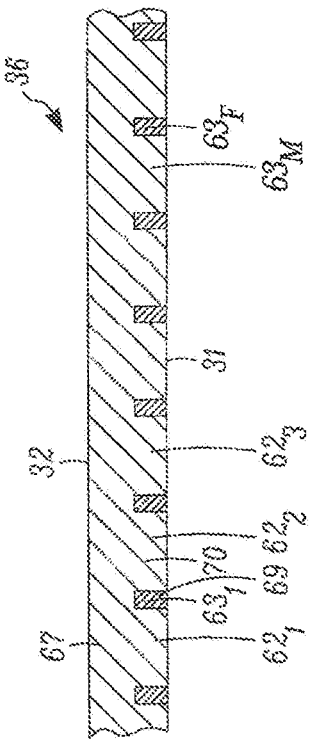

As another example, in some embodiments, the movement facilitators $63_1$-$63_F$ may be other than gaps. For instance, as shown in FIGS. 18 and 19, in some embodiments, a movement facilitator $63_i$ (which denotes any one of the movement facilitators $63_1$-$63_F$) may comprise elastic material 69 that interconnects adjacent movable zones $62_i$, $62_j$ and has a greater elasticity, i.e., a lower elastic modulus, than elastomeric material 70 of the adjacent movable zones $62_i$, $62_j$ such that the elastic material 69 stretches to allow movement of the adjacent movable zones $62_i$, $62_j$ relative to one another. For example, in some embodiments, a ratio of an elastic modulus of the elastic material 69 of the movement facilitator $63_i$ and an elastic modulus of the elastomeric material 70 of the adjacent movable zones $62_i$, $62_j$ may be no more than 0.9, in some cases no more than 0.8, in some cases no more than 0.7, and in some cases even less (e.g., no more than 0.5). In some cases, the elastic material 69 may be elastomeric material (e.g., rubber such as sponge rubber or foam rubber produced with a blowing agent or other foaming agent) that is molded with the elastomeric material 70 of the adjacent movable zones $62_i$, $62_j$ (e.g., by placing the elastic material 69 between the elastomeric material 70 of the adjacent movable zones $62_i$, $62_j$ in a mold and curing them together). The elastic material 69 may be any other suitable material in other cases (e.g., another type of foam, such as a nonelastomeric foam). In other embodiments, instead of or in addition to having a greater elasticity to stretch, the elastic material 69 may have a greater compressibility than the elastomeric material 70 of the adjacent movable zones $62_i$, $62_j$ such that the elastic material 69 compresses to allow movement of the adjacent movable zones $62_i$, $62_j$ relative to one another.

As yet another example, in some embodiments, instead of or in addition to modulating the longitudinal rigidity of the track 22, the arrangement of movable zones $62_1$-$62_M$ may modulate the widthwise rigidity of the track 22. For instance, in some embodiments, as shown in FIG. 20, the movable zones $62_1$-$62_M$ may extend along at least a substantial portion, such as at least a majority (e.g., an entirety), of the length of the track 22 and be moveable relative to one another such that the widthwise rigidity of the carcass 36 when subject to loading tending to bend the carcass 36 inwardly is different from the widthwise rigidity of the carcass 36 when subject to loading tending to bend the carcass 36 outwardly. In other embodiments, as shown in FIG. 21, the arrangement of movable zones $62_1$-$62_M$ may be an array distributed in the longitudinal and widthwise directions of the track 22 such that (i) the longitudinal rigidity of the carcass 36 when subject to loading tending to bend the carcass 36 inwardly is different from the longitudinal rigidity of the carcass 36 when subject to loading tending to bend the carcass 36 outwardly and (ii) the widthwise rigidity of the carcass 36 when subject to loading tending to bend the carcass 36 inwardly is different from the widthwise rigidity of the carcass 36 when subject to loading tending to bend the carcass 36 outwardly.

1.1.3 Carcass Comprising Reinforcing Layers of Different Stiffness

Figure 22:
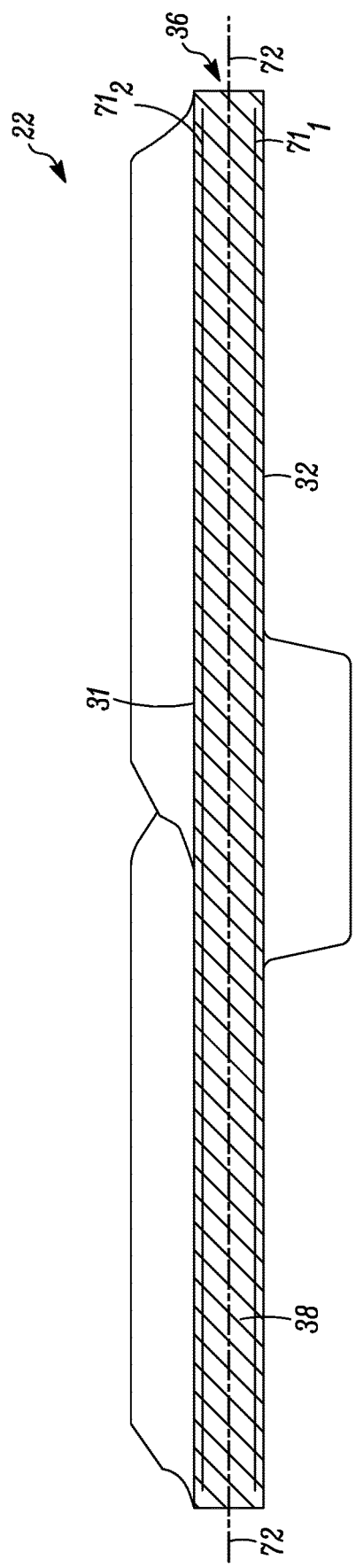
FIG. 22 shows an example in which the carcass of the track comprises reinforcing layers of different stiffness in accordance with an embodiment of the invention.

In some embodiments, as shown in FIG. 22, the carcass 36 of the track 22 may comprise a plurality of reinforcing layers $71_1$, $71_2$ of different stiffness that are respectively embedded in the rubber 38 between a neutral axis 72 of the carcass 36 and each of the inner surface 32 and the ground-engaging outer surface 31 of the carcass 36 such that the carcass 36 is easier to bend in a given way than in an opposite way.

In this embodiment, the reinforcing layer $71_1$ is embedded in the rubber 38 between the neutral axis 72 of the carcass 36 and the inner surface 32 of the carcass 36, while the reinforcing layer $71_2$ is embedded in the rubber 38 between the neutral axis 72 of the carcass 36 and the ground-engaging outer surface 31 of the carcass 36 and has a different stiffness in the widthwise direction of the track 22 than the reinforcing layer $71_1$ such that the widthwise rigidity of the carcass 36 when subject to loading tending to bend the carcass 36 inwardly is different from the widthwise rigidity of the carcass 36 when subject to loading tending to bend the carcass 36 outwardly. In this example, the widthwise rigidity of the carcass 36 when subject to loading tending to bend the carcass 36 inwardly is greater than the widthwise rigidity of the carcass 36 when subject to loading tending to bend the carcass 36 outwardly.

More particularly, in this embodiment, the reinforcing layer $71_1$ is stiffer in the widthwise direction of the track 22 than the reinforcing layer $71_2$. In this example, the reinforcing layer $71_1$ is a non-textile reinforcing layer, while the reinforcing layer $71_2$ is a textile reinforcing layer. More specifically, in this example, the reinforcing layer $71_1$ is a layer of reinforcing cables extending generally parallel to one another in the widthwise direction of the track 22 and the reinforcing layer $71_2$ is a layer of reinforcing fabric. In this case, the reinforcing cables of the layer $71_1$ are metallic cables and the layer of reinforcing fabric $71_2$ comprises a ply of reinforcing woven fibers (e.g., nylon fibers or other synthetic fibers).

The reinforcing layers $71_1$, $71_2$ may be arranged in any suitable manner within the carcass 36. In this embodiment, the reinforcing layer $71_1$ is located closer to the inner surface 32 than to the neutral axis 72 of the carcass 36 in the thickness direction of the track 22, and the reinforcing layer $71_2$ is located closer to the ground-engaging outer surface 31 than to the neutral axis 72 of the carcass 36 in the thickness direction of the track 22. In some examples, the reinforcing layers $71_1$, $71_2$ may be farthest apart from one another and farthest away from the neutral axis 72 as possible. In other embodiments, the reinforcing layer $71_1$ may be located closer to or as close to the neutral axis 72 of the carcass 36 than to the inner surface 32 in the thickness direction of the track 22, and/or the reinforcing layer $71_2$ may be located closer to or as close to the ground-engaging outer surface 31 than to the neutral axis 72 of the carcass 36 in the thickness direction of the track 22.

The reinforcing layers $71_1$, $71_2$ may be implemented in any other suitable way in other embodiments. For example, in other embodiments, the reinforcing layer $71_1$ may be a sheet (e.g. a metallic or polymeric sheet) or a mesh (e.g., a metallic mesh or sheet) that is more rigid in the widthwise direction of the track 22 than the reinforcing layer $71_1$. As another example, in other embodiments, both of the reinforcing layers $71_1$, $71_2$ may be textile reinforcing layers. As yet another example, each of the reinforcing layers $71_1$, $71_2$ may have a resistance to tension different from a resistance to compression such that the carcass 36 is easier to bend in a given way than in an opposite way.

1.2 Transversal Stiffening Cables

In some embodiments, as shown in FIGS. 23 to 25, the track 22 may comprise a plurality of transversal cables $61_1$-$61_C$ that are adjacent to one another and extend transversally to the longitudinal direction of the track 22 to enhance the widthwise rigidity of the track 22. The transversal cables $61_1$-$61_C$ are arranged such that they are in tension under loading of the mid-rollers $28_1$-$28_6$ and thus distribute load over a greater extent in the widthwise direction of the track 22.

In this embodiment, each of the transversal cables $61_1$-$61_C$ is generally straight over at least a majority, in this example an entirety, of its length when not loaded by the mid-rollers $28_1$-$28_6$. Under loading of the mid-rollers $28_1$-$28_6$, as shown in FIG. 26, the transversal cables $61_1$-$61_C$ bend such that they become concave towards the inner side 45 of the track 22. This creates a tensioning effect (e.g., localized tensions) in the transversal cables $61_1$-$61_C$ that increases the widthwise rigidity of the track 22.

In other embodiments, as shown in FIG. 27, each of the transversal cables $61_1$-$61_C$ may be uneven (i.e., non-straight) over its length when not loaded by the mid-rollers $28_1$-$28_6$. Under loading of the mid-rollers $28_1$-$28_6$, as shown in FIG. 28, the transversal cables $61_1$-$61_C$ bend and undergo a tensioning effect (e.g., localized tensions) that increases the widthwise rigidity of the track 22.

More particularly, in this embodiment, each transversal cable $61_i$ (which denotes any one of the transversal cables $61_1$-$61_C$) is wavy. Specifically, in this embodiments, segments $34_1$, $34_3$ of the transversal cable $61_i$ beneath the rolling paths $33_1$, $33_2$ of the inner side 45 of the track 22 extend closer to the inner surface 32 of the carcass 36 than a segment $34_2$ of the transversal cable $61_i$ that is between the rolling paths $33_1$, $33_2$, which in this case extends closer to the ground-engaging outer surface 31 of the carcass 36. Under loading of the mid-rollers $28_1$-$28_6$, as shown in FIG. 28, the segments $34_1$, $34_3$ of the transversal cable $61_i$ tend to deflect downwardly and the transversal cable $61_i$ undergoes a tensioning effect that increases the widthwise rigidity of the track 22.

In this example, the segments $34_1$, $34_3$ of the transversal cable $61_i$ are convex towards the inner side 45 of the track 22, while the segment $34_2$ of the transversal cable $61_i$ is concave towards the inner side 45 of the track 22. In this case, this waviness of the transversal cable $61_i$, including this convexity and concavity of its segments $34_1$-$34_3$, is achieved by the transversal cable $61_i$ being curved. In other cases, this waviness of the transversal cable $61_i$, including this convexity and concavity of its segments $34_1$-$34_3$, may be achieved by the transversal cable $61_i$ having angular portions or a combination of angular and curved portions.

Any other wavy configuration of the transversal cable $61_i$ may be used in other embodiments. For example, in other embodiments, the transversal cable $61_i$ may have a wavy configuration opposite to that shown in FIG. 27 such that the segments $34_1$, $34_3$ of the transversal cable $61_i$ beneath the rolling paths $33_1$, $33_2$ of the inner side 45 of the track 22 extend closer to the ground-engaging outer surface 31 of the carcass 36 than the segment $34_2$ of the transversal cable $61_i$ that is between the rolling paths $33_1$, $33_2$, which may extend closer to the inner surface 32 of the carcass 36.

Figure 29:
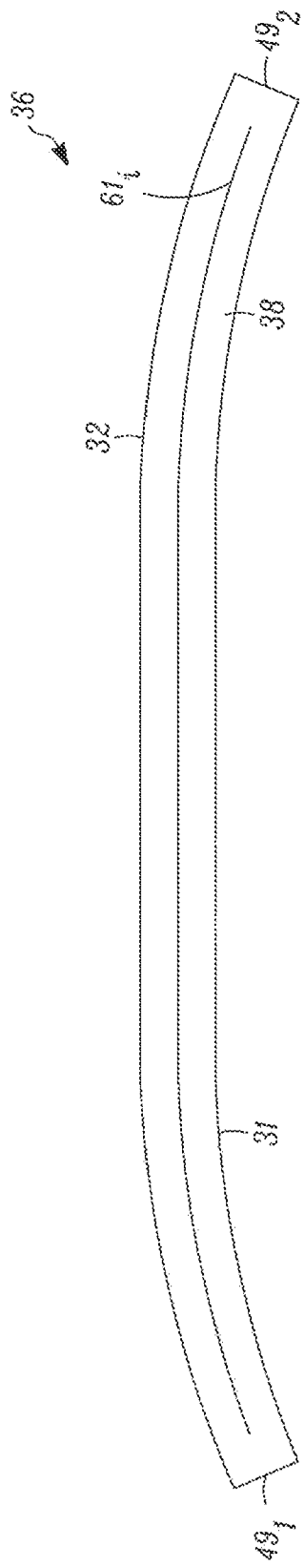

In embodiments considered above, the carcass 36 of the track 22 is generally straight in the widthwise direction of the track 22. In other embodiments, as shown in FIG. 29, the carcass 36 of the track 22 may be manufactured such that the carcass 36 is bent in the widthwise direction of the track 22 and deformable in the widthwise direction of the track 22 under loading from the mid-rollers $28_1$-$28_6$, as discussed previously in section 1.1.1, and the transversal cables $61_1$-$61_C$ are uneven such that they also change in shape under loading from the mid-rollers $28_1$-$28_6$. For example, in this embodiment, the carcass 36 is bent in the widthwise direction of the track 22 such that its inner surface 32 is convex and its ground-engaging outer surface 31 is concave and the transversal cables $61_1$-$61_C$ are concave towards the ground-engaging outer surface 31. Under loading from the mid-rollers $28_1$-$28_6$ on the rolling paths $33_1$, $33_2$, the carcass 36 flattens such that its inner surface 32 and its ground-engaging outer surface 31 become flatter and the transversal cables $61_1$-$61_C$ also become flatter, thereby increasing the widthwise rigidity of the track 22.

The transversal cables $61_1$-$61_C$ may be implemented in various ways. For example, in this embodiment, each of the transversal cables $61_1$-$61_C$ is a cord including a plurality of strands (e.g., metallic wires or textile fibers). In this case, each of the transversal cables $61_1$-$61_C$ is a metallic cable For instance, in some examples, each metallic cable may be a steel cable having any suitable diameter (e.g., a diameter of at least 1.5 mm). In other embodiments, each of the transversal cables $61_1$-$61_C$ may be another type of cable and may be made of any material suitably flexible along the cable's longitudinal axis (e.g., plastic or composite material).

Figure 30:
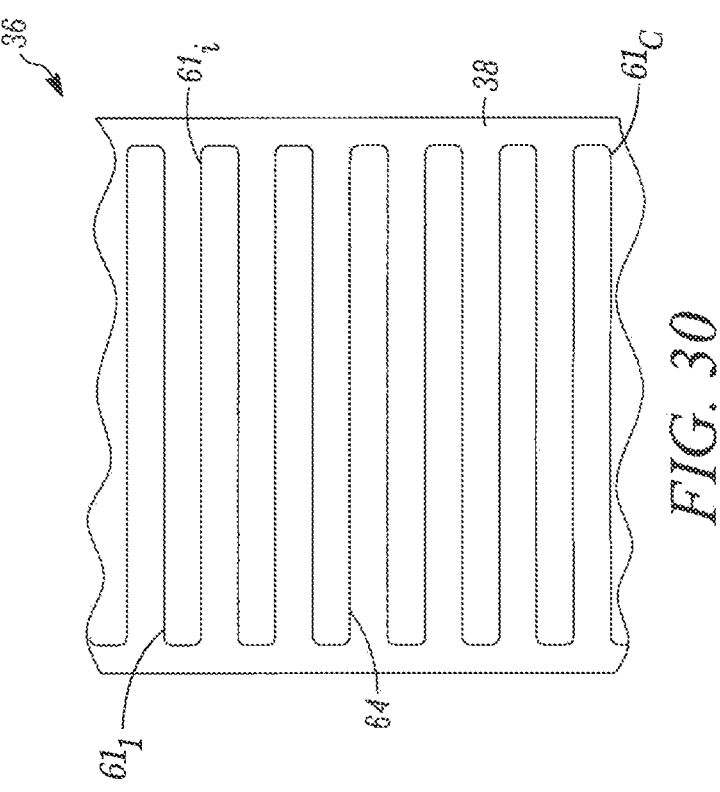

In this embodiment, respective ones of the transversal cables $61_1$-$61_C$ are separate and independent from one another (i.e., unconnected other than by elastomeric material of the track 22). In other embodiments, as shown in FIG. 30, respective ones of the transversal cables $61_1$-$61_C$ may be constituted by a single continuous cable length 64 turning in a serpentine way such that there is a turn of the single continuous cable length 64 between adjacent ones of the transversal cables $61_1$-$61_C$.

The layer of transversal cables $61_1$-$61_C$ may be implemented in various other ways in other embodiments.

1.3 Variation of Reinforcement Density

Figure 31:
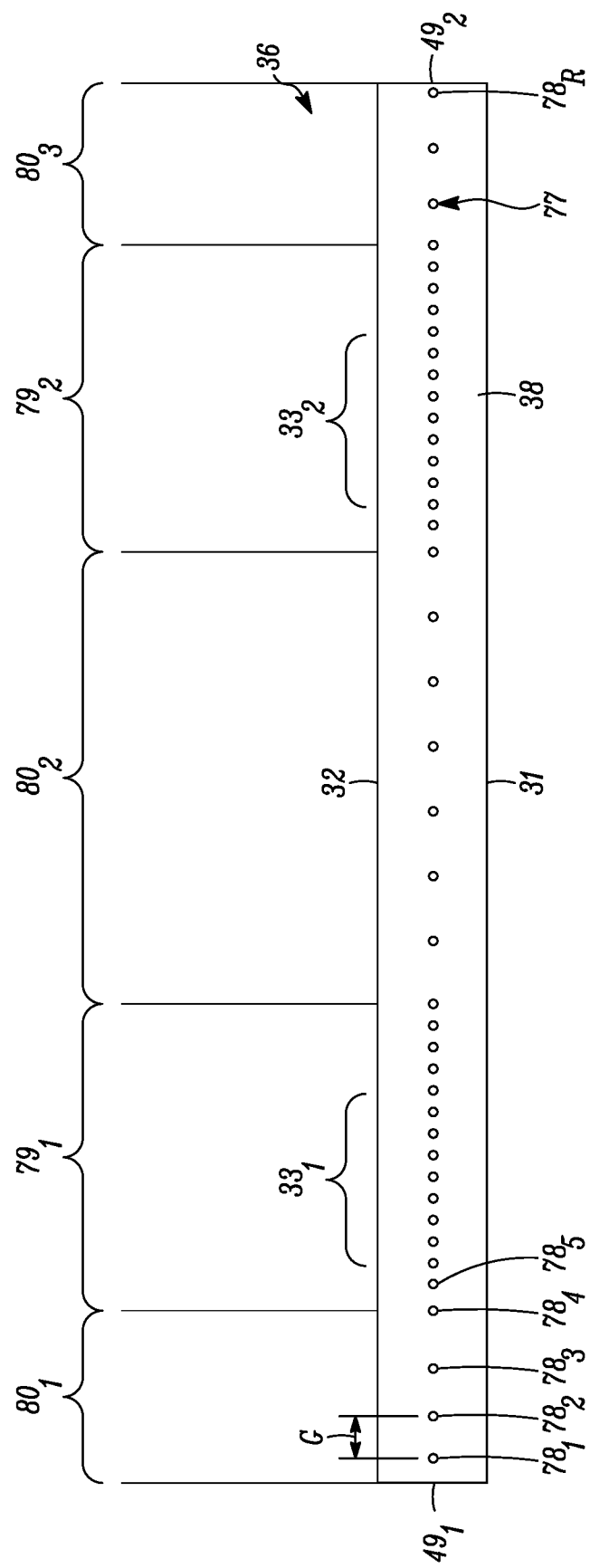
FIGS. 31, 38 and 39 show examples in which the carcass of the track exhibits a widthwise variation of density of a reinforcing layer embedded in elastomeric material of the carcass in accordance with embodiments of the invention.

In some embodiments, as shown in FIG. 31, the carcass 36 may exhibit a widthwise variation of density of a reinforcing layer 77 embedded in the rubber 38 of the carcass 36, i.e., a variation of a density of the reinforcement layer 77 in the widthwise direction of the track 22. The density of the reinforcement layer 77 refers to a quantity of reinforcing material of the reinforcement layer 77 (i.e., that material of the reinforcement layer 77 embedded in the rubber 38) per unit length in the widthwise direction of the track 22.

In this embodiment, the reinforcing layer 77 is a layer of reinforcing cables $78_1$-$78_R$ (which denotes any one of the reinforcing cables $78_1$-$78_R$, such as reinforcing cables $78_2$, $78_3$, $78_4$ and $78_5$) that are adjacent to one another and extend generally in the longitudinal direction of the track 22 to enhance strength in tension of the track 22 along its longitudinal direction. The density of the layer of reinforcing cables $78_1$-$78_R$ is greater in certain regions $79_1$, $79_2$ of the track 22 than in other regions $80_1$-$80_3$ of the track 22. To that end, in this embodiment, a pitch G of the reinforcing cables $78_1$-$78_R$, which is a distance between central longitudinal axes of two adjacent ones of the reinforcing cables $78_1$-$78_R$, varies across the reinforcing layer 77 in the widthwise direction of the track 22. The pitch G of the reinforcing cables $78_1$-$78_R$ is smaller (i.e., adjacent ones of the reinforcing cables $78_1$-$78_R$ are closer to one another) in the regions $79_1$, $79_2$ of the track 22 than in the regions $80_1$-$80_3$ of the track 22.

More particularly, in this embodiment, each of the regions $79_1$, $79_2$ of the track 22 overlaps with a respective one of the rolling paths $33_1$, $33_2$ for the mid-rollers $28_1$-$28_6$ in the widthwise direction of the track 22, while the regions $80_1$-$80_3$ of the track 22 do not overlap with the rolling paths $33_1$, $33_2$ in the widthwise direction of the track 22. There is thus a greater density of reinforcing cables beneath the rolling paths $33_1$, $33_2$ than elsewhere. This may help to better support the mid-rollers $28_1$-$28_6$ as they roll on the rolling paths $33_1$, $33_2$.

The widthwise variation of density of the reinforcing layer 77 may be implemented in various other ways in other embodiments.

Figure 38:
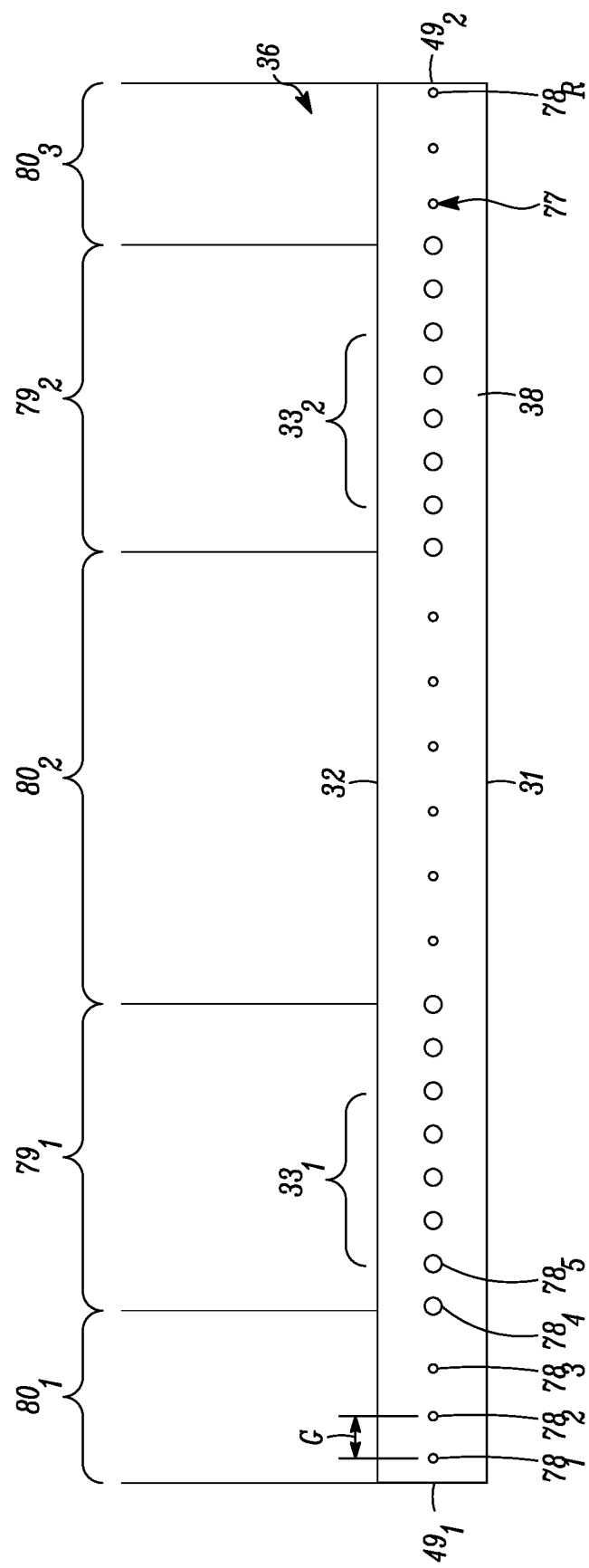

For example, in other embodiments, as shown in FIG. 38, instead of or in addition to varying the pitch G of the reinforcing cables $78_1$-$78_R$ across the reinforcing layer 77 in the widthwise direction of the track 22, the density of the layer of reinforcing cables $78_1$-$78_R$ may be greater in the regions $79_1$, $79_2$ of the track 22 than in the regions $80_1$-$80_3$ of the track 22 by varying a diameter of the reinforcing cables $78_1$-$78_R$ across the reinforcing layer 77 in the widthwise direction of the track 22 such that the diameter of the reinforcing cables $78_1$-$78_R$ is greater in the regions $79_1$, $79_2$ of the track 22 than in the regions $80_1$-$80_3$ of the track 22 (i.e., cables beneath the rolling paths $33_1$, $33_2$ may have a larger diameter than cables elsewhere in the track 22).

Figure 39:
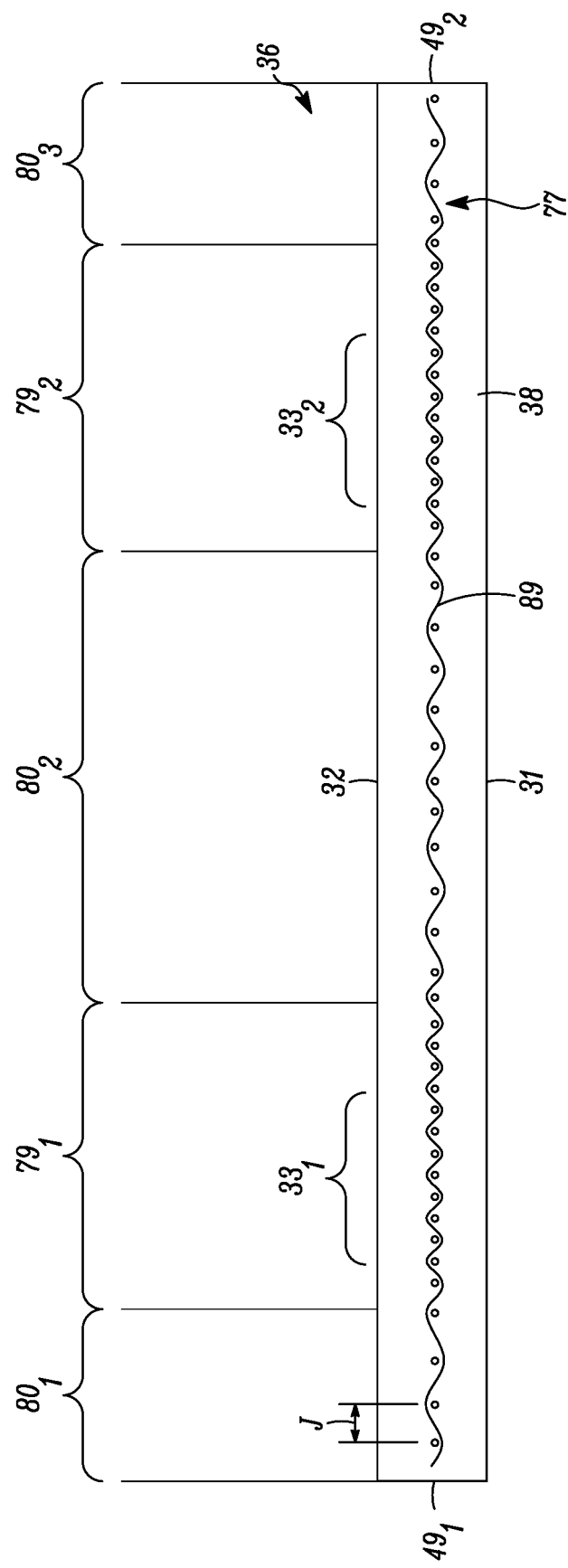

As another example, in other embodiments, as shown in FIG. 39, the reinforcing layer 77 may be a layer of reinforcing fabric 89 (e.g., a ply of reinforcing woven fibers) and the density of the reinforcing fabric 89 may be greater in the regions $79_1$, $79_2$ of the track 22 than in the regions $80_1$-$80_3$ of the track 22. To that end, in this embodiment, a pitch J of elongated fabric elements (e.g., fibers, filaments, strands and/or others) of the reinforcing fabric 89 varies across the reinforcing layer 77 in the widthwise direction of the track 22. The pitch J of the elongated fabric elements of the reinforcing fabric 89 is smaller (i.e., the reinforcing fabric 89 is "tighter" as adjacent ones of the elongated fabric elements are closer to one another) in the regions $79_1$, $79_2$ of the track 22 than in the regions $80_1$-$80_3$ of the track 22.

2. Self-Aligning Track

Figure 32:
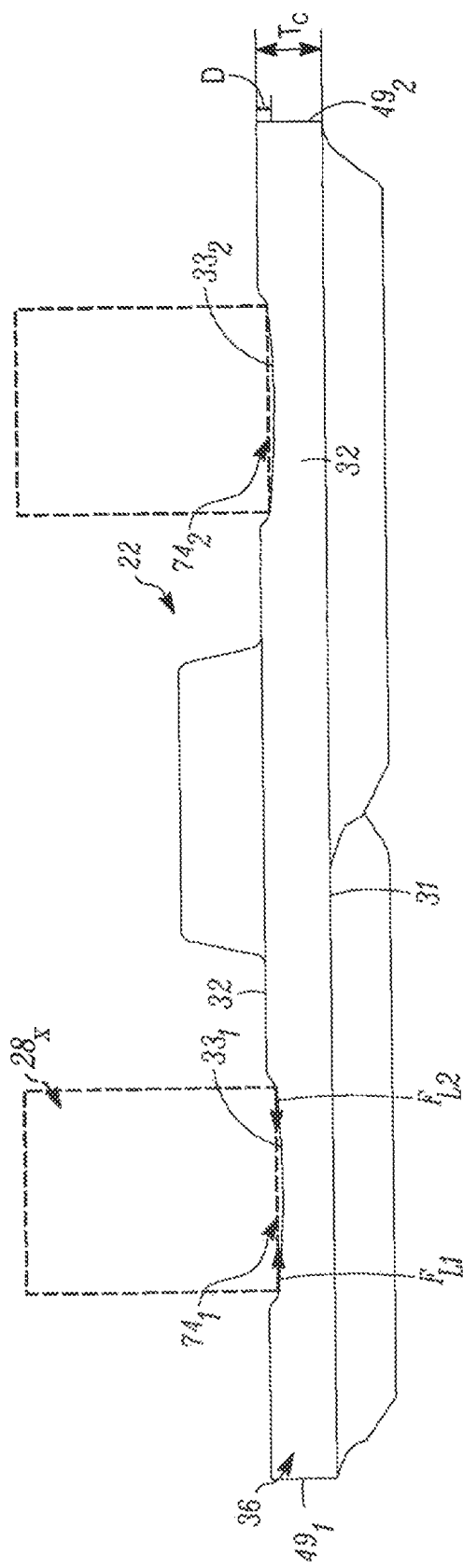

In some embodiments, as shown in FIGS. 32 and 33, the track 22 may be self-aligning. The track 22 is configured to oppose lateral movement of the track 22 relative to respective ones of the wheels 24, 26, $28_1$-$28_6$ (i.e., movement of the track 22 relative to respective ones of the wheels 24, 26, $28_1$-$28_6$ in the widthwise direction of the track 22) in order to align the track 22 within the track system $16_1$.

In this embodiment, the inner surface 32 of the carcass 36 includes a plurality of aligners $74_1$, $74_2$ spaced from one another to align respective areas of the inner surface 32 with given ones of the wheels 24, 26, $28_1$-$28_6$. More particularly, in this embodiment, the aligners $74_1$, $74_2$ are configured to align the rolling paths $33_1$, $33_2$ with the mid-rollers $28_1$-$28_6$. In that sense, in this embodiment, the aligners $74_1$, $74_2$ can be referred to as "rolling path aligners". The rolling path aligners $74_1$, $74_2$ extend in the rolling paths $33_1$, $33_2$ (i.e., at least part of each of the rolling path aligners $74_1$, $74_2$ is located in a respective one of the rolling paths $33_1$, $33_2$ in the widthwise direction of the track 22). Each rolling path aligner $74_1$, $74_2$ is configured to exert lateral force components $F_{L1}$, $F_{L2}$ on a mid-roller $28_x$ (which denotes any of the mid-roller $28_1$-$28_6$) which tend to align the rolling path $33_i$ with the mid-roller $28_x$ and thus align the track 22 within the track system $16_1$. The lateral force components $F_{L1}$, $F_{L2}$ act in the widthwise direction of the track 22 and are oriented opposite one another to maintain the rolling path $33_i$ aligned with the mid-roller $28_x$.

More particularly, in this embodiment, the aligners $74_1$, $74_2$ are recesses. Each recess $74_1$, $74_2$ has a depth D with respect to a top point of the inner surface 32 of the carcass 36. For example, in some embodiments, a ratio $D/T_c$ of the depth D of the recess $74_1$, $74_2$ over the thickness Tc of the carcass 36 may be at least 0.05, in some cases at least 0.075, in some cases at least 0.10, in some cases at least 0.125, and in some cases even more (e.g., 0.15, 0.20 or more). The ratio $D/T_c$ may have any other suitable value in other embodiments.

In this example, the recesses $74_1$, $74_2$ are longitudinal grooves that extend in the longitudinal direction of the track 22. In this case, the recesses $74_1$, $74_2$ extend along at least a majority of the length of the track 22. More specifically, in this case, they extend along an entirety of the length of the track 22.

In some embodiments, the aligners $74_1$, $74_2$ of the inner surface 32 of the carcass 36 may, in addition to or instead of being aligned with the mid-rollers $28_1$-$28_6$, be aligned with at least part of the drive wheel 24 and/or the idler wheel 26. A dimension of each of the aligners $74_1$, $74_2$ in the widthwise direction of the track 32 may thus be selected such that the aligners $74_1$, $74_2$ receive and accommodate at least part of the drive wheel 24 and/or the idler wheel 26.

The aligners $74_1$, $74_2$ of the inner surface 32 of the carcass 36 may be implemented in various other ways in other embodiments.

3. Carcass Comprising a Peripheral Reinforcing Layer

Figure 34A:
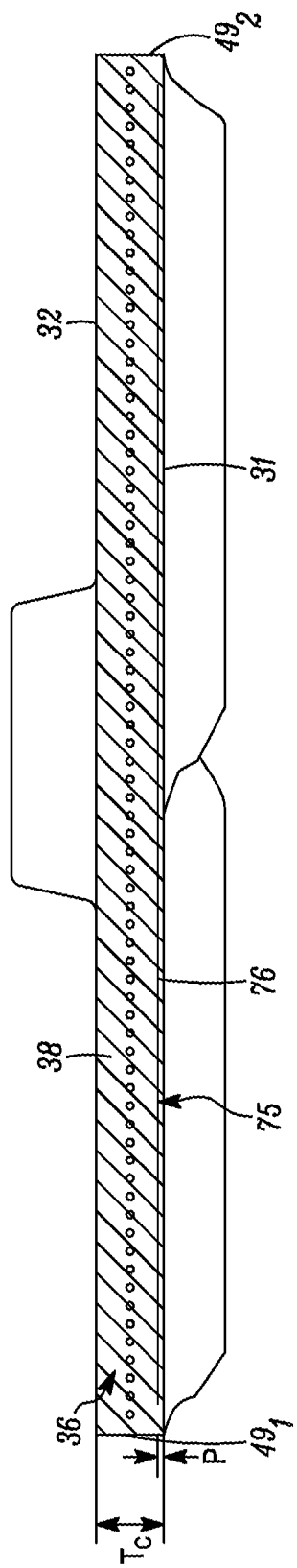
FIGS. 34A and 35A show examples in which the carcass of the track comprises a peripheral reinforcing layer adjacent to its outer periphery in accordance with embodiments of the invention.

In some embodiments, as shown in FIGS. 34A and 34B the carcass 36 may comprise a peripheral reinforcing layer 75 adjacent to a periphery of the carcass 36 to protect against rupture, such as puncture and/or cracking, or other deterioration of the periphery of the carcass 36 (e.g., due to rocks, stubble, or other objects on the ground, etc.).

The peripheral reinforcing layer 75 is adjacent to the periphery of the carcass 36 in that it is at or near a given one of the ground-engaging outer surface 31 and the inner surface 32 of the carcass 36 (as shown in any one of FIGS. 34A to 35B), i.e., within a distance P from the given one of the ground-engaging outer surface 31 (as shown in FIG. 34A) and the inner surface 32 (as shown in FIG. 34B) of the carcass 36 of less than 10% of the thickness Tc of the carcass 36 ($0 \leq P/T_c < 0.1$).

In the embodiment of FIG. 34A, the peripheral reinforcing layer 75 is adjacent to the ground-engaging outer surface 31 of the carcass 36. More particularly, in this embodiment, the peripheral reinforcing layer 75 is near the ground-engaging outer surface 31 of the carcass 36 such that the distance P is greater than 0 but less than 10% of the thickness Tc of the carcass 36 ($0 < P/T_c < 0.10$). For example, in some embodiments, the distance P from the peripheral reinforcing layer 75 to the ground-engaging outer surface 31 of the carcass 36 may be less than 5 mm, in some cases no more than 4 mm, in some cases no more than 3mm, and in some cases even less (e.g., 2 mm or less). The distance P may have any other suitable value in other embodiments.

The peripheral reinforcing layer 75 comprises reinforcing material 76 having a greater mechanical strength and/or a greater hardness than the rubber 38 of the carcass 36.

In this example of implementation, the peripheral reinforcing layer 75 is a puncture-resistant layer such that the reinforcing material 76 is a puncture-resistant material having a greater resistance to puncture than the rubber 38 of the carcass 36. Also, in this example of implementation, the peripheral reinforcing layer 75 is a crack-resistant layer such that the reinforcing material 76 is a crack-resistant material having a greater resistance to cracking (i.e., crack initiation and/or crack propagation) than the rubber 38 of the carcass 36.

In this embodiment, the reinforcing material 76 is reinforcing fabric. More particularly, in this example of implementation, the reinforcing fabric 76 is woven fabric (e.g., of Kevlar™ or any other suitable polymeric material). The reinforcing fabric 76 may be any other suitable fabric in other examples of implementation (e.g., tire cord fabric, metallic fabric).

Figure 35A:
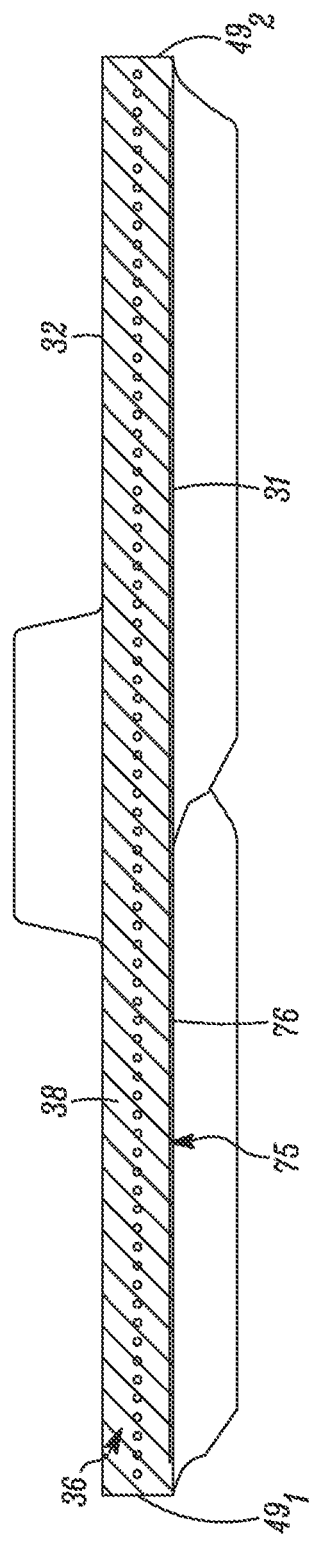

The peripheral reinforcing layer 75 may be implemented in various other ways in other embodiments. For example, in other embodiments, as shown in FIG. 35A, the peripheral reinforcing layer 75 may be at the ground-engaging outer surface 31 of the carcass 36 (P=0). In other words, in that embodiment, the reinforcing material 76 of the peripheral reinforcing layer 75 constitutes at least part of the ground-engaging outer surface 31 of the carcass 36. As another example, in other embodiments, the reinforcing material 76 may be any other suitable type of material (e.g., a sheet of metal or polymer, a layer of transversal polymeric or metallic cables, a layer of elastomeric material such as polyurethane different from the rubber 38 inside the carcass 36, etc.).

4. Carcass Comprising a Multitude of Reinforcing Fabric Layers

In some embodiments, as shown in FIGS. 36 and 37, the carcass 36 may comprise a multitude of reinforcing fabric layers $81_1$-$81_F$ that are stacked in the thickness direction of the track 22. The multitude of reinforcing fabric layers $81_1$-$81_F$ includes at least eight reinforcing fabric layers, in some cases at least ten reinforcing fabric layers, in some cases at least twelve reinforcing fabric layers, in some cases at least fifteen reinforcing fabric layers, and in some cases even more (e.g., twenty or more reinforcing fabric layers).

Each reinforcing fabric layer $81_1$, $81_2$-$81_F$ includes a ply of reinforcing fabric. For example, in some embodiments, the ply of reinforcing fabric of the reinforcing fabric layer $81_i$ may be a woven fabric (e.g., a rubber coated fabric) or a tire cord fabric.

A spacing C of two adjacent ones of the reinforcing fabric layers $81_1$-$81_F$ in the thickness direction of the track 22 can be relatively small. For example, in some embodiments, a ratio $C/T_c$ of the spacing C of two adjacent ones of the reinforcing fabric layers $81_1$-$81_F$ over the thickness $T_c$ of the carcass 36 may be no more than 0.05, in some cases no more than 0.03, in some cases no more than 0.01, and in some cases even less. The ratio $C/T_c$ may have any other suitable value in other embodiments. For instance, in some embodiments, the spacing C of two adjacent ones of the reinforcing fabric layers $81_1$-$81_F$ may be no more than 4 mm, in some cases no more than 3 mm, in some cases no more than 2 mm, and in some cases even less (e.g., 1 mm or less). The spacing C of two adjacent ones of the reinforcing fabric layers $81_1$-$81_F$ may have any other suitable value in other embodiments.

In this embodiment, respective ones of the reinforcing fabric layers $81_1 81_F$ have elongated fabric elements (e.g., fibers, filaments, strands, or cords) extending in different directions. That is, elongated fabric elements of a given reinforcing fabric layer $8_i$, (which denotes any one of the fabric layer $81_1$-$81_F$) extend in a direction different from any direction in which elongated fabric elements of another reinforcing fabric layer $81_j$ (which denotes any one of the fabric layers $81_1$-$81_F$, but different from the given reinforcing fabric layer $81_i$) extend. For instance, in this embodiment, a bias of a given reinforcing fabric layer $81_i$ is different from a bias of another reinforcing fabric layer $81_j$ (e.g., the bias of the reinforcing fabric layer $81_i$ may differ from the bias of the reinforcing fabric layer $81_j$ by +/−45° or any other suitable oblique angle).

In some embodiments, the reinforcing fabric layers $81_1$-$81_F$ may provide sufficient strength in tension to the track 22 that the track 22 is free of any layer of reinforcing cables adjacent to one another and extending in the longitudinal direction of the track 22 (e.g., such as the reinforcing cables $37_1$-$37_M$ discussed above).

The reinforcing fabric layers $81_1$-$81_F$ may be implemented in various other ways in other embodiments. For example, in some embodiments, the spacing C of adjacent ones of the reinforcing fabric layers $81_1$-$81_F$ may vary in the thickness direction of the track 22 (e.g., the spacing C may be smaller or greater near the ground-engaging outer surface 31 and/or the inner surface 32 of the carcass 32 than at the neutral axis 72 of the track 22).

In some embodiments, any feature of any embodiment described herein may be used in combination with any feature of any other embodiment described herein.

Each track system 16₁ of the agricultural vehicle 10, including its track 22, may be configured in various other ways in other embodiments.

For example, each track system 16₁ may comprise different and/or additional components in other embodiments. For example, in some embodiments, the track system 16₁ may comprise a front drive wheel (e.g., the idler wheel 26 may be replaced by a drive wheel) instead of or in addition to the drive wheel 24. As another example, in some embodiments, the track system 16₁ may comprise more or less roller wheels such as the roller wheels $28_1$-$28_6$. As yet another example, rather than have a generally linear configuration as in this embodiment, in other embodiments, the track system 16₁ may have various other configurations (e.g., a generally triangular configuration with the axis of rotation of the drive wheel 24 located between the axes of rotations of leading and trailing idler wheels).

While in the embodiment considered above the off-road vehicle 10 is an agricultural vehicle, in other embodiments, the vehicle 10 may be another industrial vehicle such as a construction vehicle (e.g., a loader, a bulldozer, an excavator, etc.) for performing construction work or a forestry vehicle (e.g., a feller-buncher, a tree chipper, a knuckleboom loader, etc.) for performing forestry work, or a military vehicle (e.g., a combat engineering vehicle (CEV), etc.) for performing military work, a snowmobile, an all-terrain vehicle (ATV), or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being mountable around a plurality of wheels that are configured to drive and guide the track, the wheels including a drive wheel configured to drive the track and a plurality of roller wheels configured to roll on a bottom run of the track, the track being elastomeric to be flexible around the wheels, the track comprising:
   a carcass comprising a ground-engaging outer surface and an inner surface opposite to the ground-engaging outer surface;
   a plurality of traction projections projecting from the ground-engaging outer surface of the carcass; and
   a plurality of wheel-contacting projections projecting from the inner surface of the carcass;
   wherein: the inner surface of the carcass comprises a plurality of rolling paths for respective ones of the roller wheels; a first one of the rolling paths occupies a majority of a distance from the wheel-contacting projections to a first lateral edge of the track in a widthwise direction of the track; a second one of the rolling paths occupies a majority of a distance from the wheel-contacting projections to a second lateral edge of the track opposite to the first lateral edge of the track in the widthwise direction of the track; and
   the carcass comprises elastomeric material, reinforcing cables embedded in the elastomeric material and extending in a longitudinal direction of the track, and reinforcing woven fabric embedded in the elastomeric material, disposed between the inner surface of the carcass and the reinforcing cables, and extending beneath the rolling paths;
   wherein a density of reinforcement of the carcass varies in the widthwise direction of the track.

2. The track of claim 1, wherein the reinforcing woven fabric is closer to the inner surface of the carcass than to the reinforcing cables in a thickness direction of the carcass.

3. The track of claim 1, wherein the reinforcing woven fabric is closer to the wheel paths than to a center of the carcass in a thickness direction of the carcass.

4. The track of claim 1, wherein the reinforcing woven fabric is closer to the inner surface of the carcass than to a neutral axis of the carcass in a thickness direction of the carcass.

5. The track of claim 1, wherein the reinforcing woven fabric is spaced from the inner surface of the carcass by less than one-tenth of a thickness of the carcass from the inner surface of the carcass to the ground-engaging outer surface of the carcass.

6. The track of claim 1, wherein the reinforcing woven fabric extends beneath the wheel-contacting projections.

7. The track of claim 1, wherein the reinforcing woven fabric occupies a majority of a width of the track.

8. The track of claim 1, wherein the carcass is more reinforced beneath each of the first one of the rolling paths and the second one of the rolling paths than between the first one of the rolling paths and the second one of the rolling paths.

9. The track of claim 8, wherein a density of the reinforcing woven fabric is greater beneath each of the first one of the rolling paths and the second one of the rolling paths than between the first one of the rolling paths and the second one of the rolling paths.

10. The track of claim 1, wherein the carcass is more reinforced beneath each of the first one of the rolling paths and the second one of the rolling paths than elsewhere along a widthwise direction of the carcass.

11. The track of claim 10, wherein a density of the reinforcing woven fabric is greater beneath each of the first one of the rolling paths and the second one of the rolling paths than elsewhere along a widthwise direction of the carcass.

12. The track of claim 1, wherein the carcass is reinforced closer to the inner surface of the carcass beneath each of the first one of the rolling paths and the second one of the rolling paths than between the first one of the rolling paths and the second one of the rolling paths.

13. The track of claim 1, wherein the carcass is reinforced closer to the inner surface of the carcass beneath each of the first one of the rolling paths and the second one of the rolling paths than elsewhere along a widthwise direction of the carcass.

14. The track of claim 1, wherein the wheel-contacting projections are configured to engage the drive wheel for driving the track.

15. A track for traction of a vehicle, the track being mountable around a plurality of wheels that are configured to drive and guide the track, the wheels including a drive wheel configured to drive the track and a plurality of roller wheels configured to roll on a bottom run of the track, the track being elastomeric to be flexible around the wheels, the track comprising:
- a carcass comprising a ground-engaging outer surface and an inner surface opposite to the ground-engaging outer surface;
- a plurality of traction projections projecting from the ground-engaging outer surface of the carcass; and
- a plurality of wheel-contacting projections projecting from the inner surface of the carcass;
- wherein: the inner surface of the carcass comprises a plurality of rolling paths for respective ones of the roller wheels; the carcass comprises elastomeric material, reinforcing cables embedded in the elastomeric material and extending in a longitudinal direction of the track, and reinforcing woven fabric embedded in the elastomeric material, disposed between the inner surface of the carcass and the reinforcing cables, and extending beneath the rolling paths; and the reinforcing woven fabric is closer to the wheel paths than to a center of the carcass in a thickness direction of the carcass; and
- wherein the carcass is more reinforced beneath each of the rolling paths than between each of the rolling paths.

16. A track for traction of a vehicle, the track being mountable around a plurality of wheels that are configured to drive and guide the track, the wheels including a drive wheel configured to drive the track and a plurality of roller wheels configured to roll on a bottom run of the track, the track being elastomeric to be flexible around the wheels, the track comprising:
- a carcass comprising a ground-engaging outer surface and an inner surface opposite to the ground-engaging outer surface;
- a plurality of traction projections projecting from the ground-engaging outer surface of the carcass; and
- a plurality of wheel-contacting projections projecting from the inner surface of the carcass;
- wherein: the inner surface of the carcass comprises a plurality of rolling paths for respective ones of the roller wheels; and the carcass comprises elastomeric material and a plurality of reinforcements embedded in the elastomeric material and
- arranged such that the carcass is more reinforced beneath each of a first one of the rolling paths and a second one of the rolling paths than between the first one of the rolling paths and the second one of the rolling paths; and
- wherein a density of the plurality of reinforcements is greater beneath each of the first one of the rolling paths and the second one of the rolling paths than between the first one of the rolling paths and the second one of the rolling paths.

* * * * *

UNITED STATES PATENT AND TRADEMARK OFFICE
CERTIFICATE OF CORRECTION

PATENT NO. : 11,932,330 B2
APPLICATION NO. : 16/904194
DATED : March 19, 2024
INVENTOR(S) : Marc Favre and Jake Dalphond It is certified that error appears in the above-identified patent and that said Letters Patent is hereby corrected as shown below:

In the Specification

The paragraph beginning at Column 7, Line 61 and ending at Column 8, Line 18 should be deleted;

The text inserted at Column 7, Line 61 should read "In this embodiment, the endless track 22 is a one-piece "jointless" track such that the carcass 36 is a one-piece jointless carcass. In other embodiments, the endless track 22 may be a "jointed" track (i.e., having at least one joint connecting adjacent parts of the track 22) such that the carcass 36 is a jointed carcass (i.e., which has adjacent parts connected by the at least one joint). For example, in some embodiments, the track 22 may comprise a plurality of track sections interconnected to one another at a plurality of joints, in which case each of these track sections includes a respective part of the carcass 36. In other embodiments, the endless track 22 may be a one-piece track that can be closed like a belt with connectors at both of its longitudinal ends to form a joint.";

In Column 8, Line 45 "guide lug $48_i$ may interact with the drive wheel 24 to drive" should be corrected to read "guide lug $48_i$ (which denotes any of the inner projections $48_1$-$48_N$) may interact with the drive wheel 24 to drive";

In Column 9, Line 42 "The roller wheels 281_286 roll on respective" should be corrected to read "The roller wheels $28_1$-$28_6$ roll on respective";

In Column 9, Line 43 "rolling paths $331_1$, $33_2$ of the inner" should be corrected to read "rolling paths $33_1$, $33_2$ of the inner";

In Column 9, Line 50 "track assembly $161_1$, the roller wheel $28_1$-$28_6$" should be corrected to read "track assembly $16_1$, the roller wheel $28_1$-$28_6$"; and In Column 15, Line 56 "cables $37_1$--$37_m$ can slide relative to the movable zone $62_x$" should be corrected to read "cables $37_1$-$37_M$ can slide relative to the movable zone $62_x$".

Signed and Sealed this
First Day of October, 2024

*Katherine Kelly Vidal*

Katherine Kelly Vidal
*Director of the United States Patent and Trademark Office*